United States Patent [19]

Matsuda

[11] Patent Number: 5,057,923
[45] Date of Patent: Oct. 15, 1991

[54] IMAGE PICKUP DEVICE CAPABLE OF PICKING UP IMAGES WHILE ELECTRONICALLY ENLARGING THE SAME

[75] Inventor: Noboru Matsuda, Tochigi, Japan
[73] Assignee: Sharp Kabushiki Kaisha, Osaka, Japan
[21] Appl. No.: 503,153
[22] Filed: Apr. 2, 1990

[30] Foreign Application Priority Data

Apr. 4, 1989 [JP] Japan .................... 1-86179

[51] Int. Cl.⁵ .................... H04N 3/223; H04N 9/64
[52] U.S. Cl. .................... 358/180; 358/21
[58] Field of Search .................... 358/24 R, 180, 22 C

[56] References Cited

U.S. PATENT DOCUMENTS

| | | |
|---|---|---|
| 3,935,381 | 1/1976 | Petrocelli . |
| 4,470,076 | 9/1984 | Arai et al. . |
| 4,654,711 | 3/1987 | Mikado .................... 358/180 |
| 4,670,790 | 6/1987 | Sawada et al. .................... 358/21 R |
| 4,716,455 | 12/1987 | Ozawa . |
| 4,774,581 | 9/1988 | Shiratsuchi .................... 358/22 C |
| 4,963,981 | 10/1990 | Todaka et al. .................... 358/180 |

FOREIGN PATENT DOCUMENTS

| | | |
|---|---|---|
| A2211320 | 7/1986 | European Pat. Off. . |
| A1285894 | 3/1988 | European Pat. Off. . |
| A1036374 | 10/1964 | United Kingdom . |
| A2064259 | 10/1980 | United Kingdom . |

Primary Examiner—Howard W. Britton
Assistant Examiner—Wendy R. Greening

[57] ABSTRACT

An image pickup device, capable of enlarging images while electronically enlarging the same, picks up images of an object while electronically enlarging the same by two times relative to those in the normal image pickup. In the enlarging image pickup mode, signals having been delayed by a 6H delay circuit are interpolated by a luminance signal interpolating circuit. Horizontal contour of an image based on the interpolated signals is corrected by a horizontal aperture circuit, while vertical contour is corrected by a vertical aperture circuit in response to outputs of the 6H delay circuit. Horizontal contour correcting signals and vertical contour correcting signals are added by an aperture adding circuit. Meanwhile, color-difference signals have their random noises eliminated by a CNR circuit, and are delayed by another 6H delay circuit and interpolated by a color-difference signal interpolating circuit. The interpolated signals are converted by a color-difference signal converting circuit into color-difference signals which are applied to an encoder. For the 6H delay circuit, n/2 CCD 1H delay lines are employed, which can delay the luminance signals or the color-difference signals by n horizontal scanning periods, so that the delay circuit can be reduced in number.

9 Claims, 20 Drawing Sheets

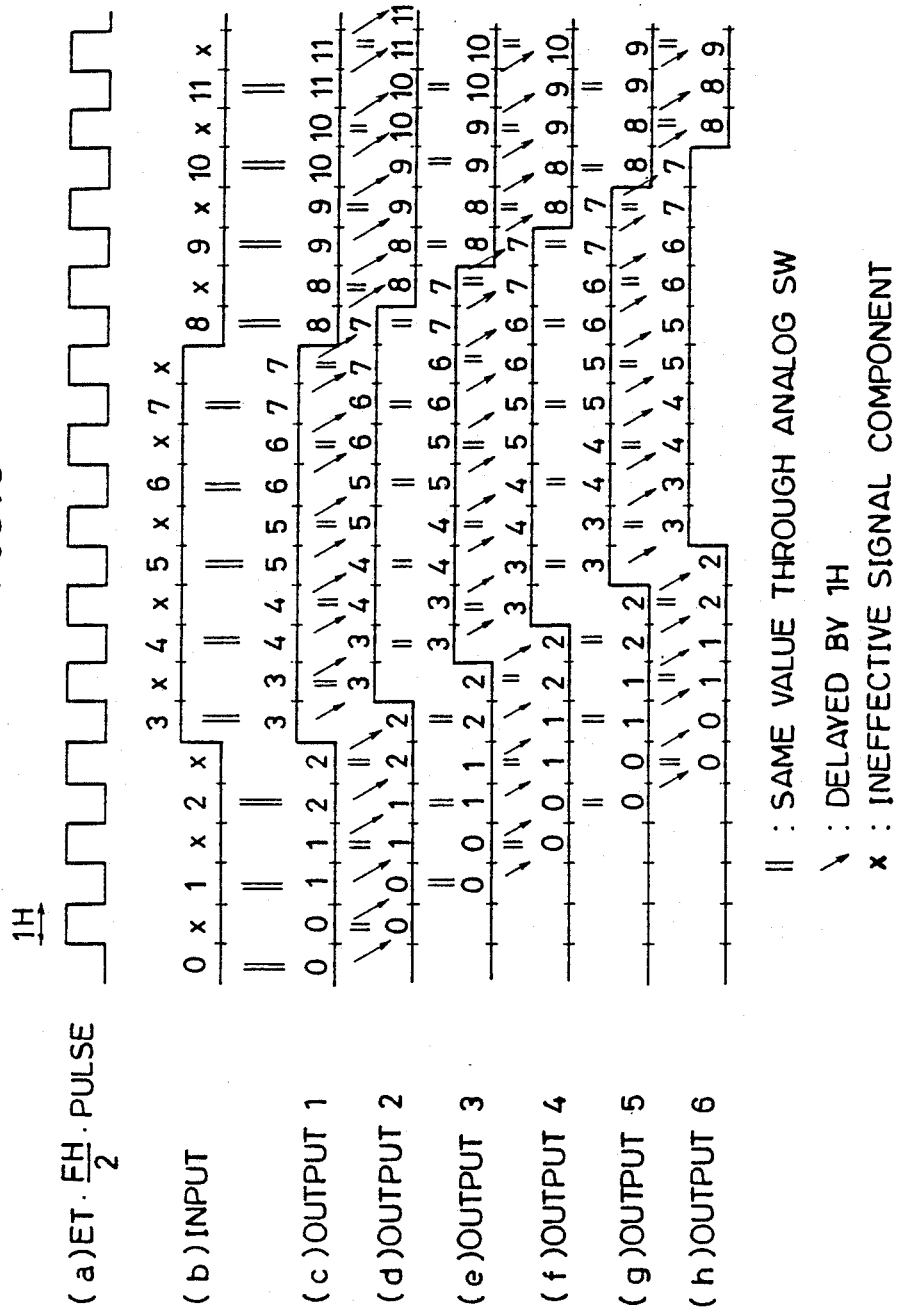

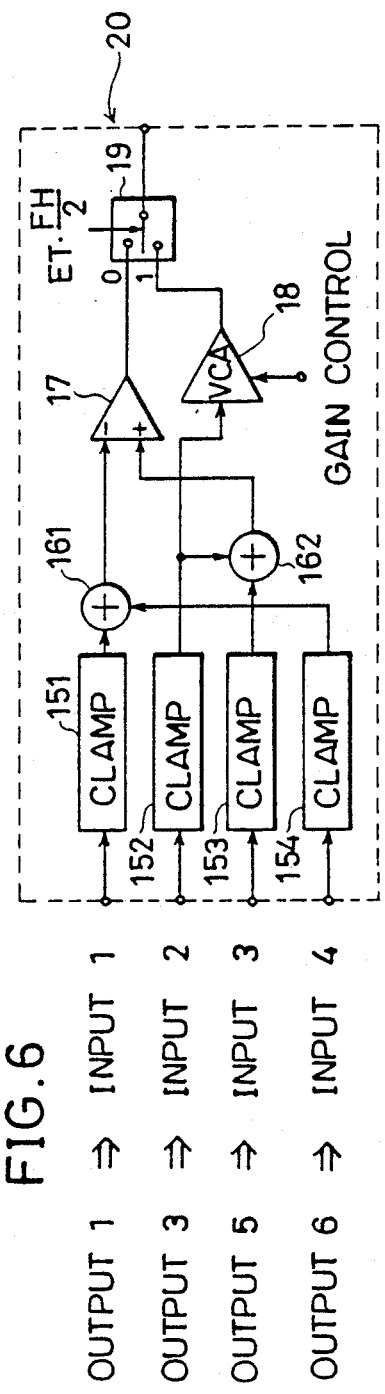
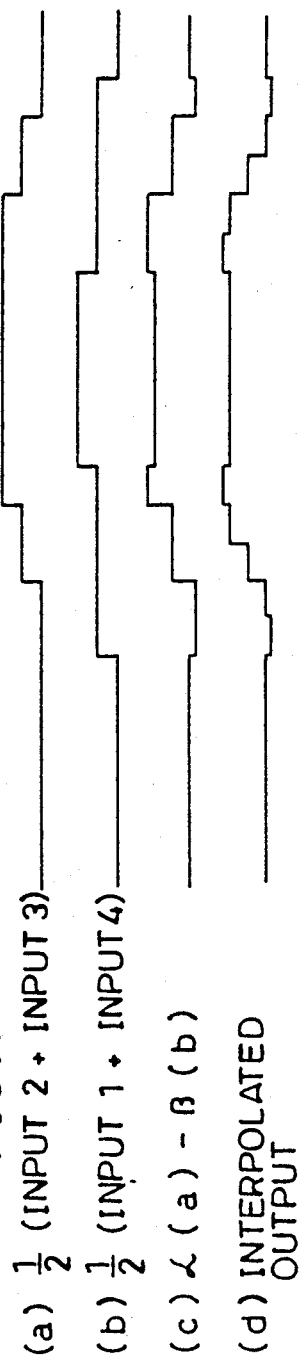

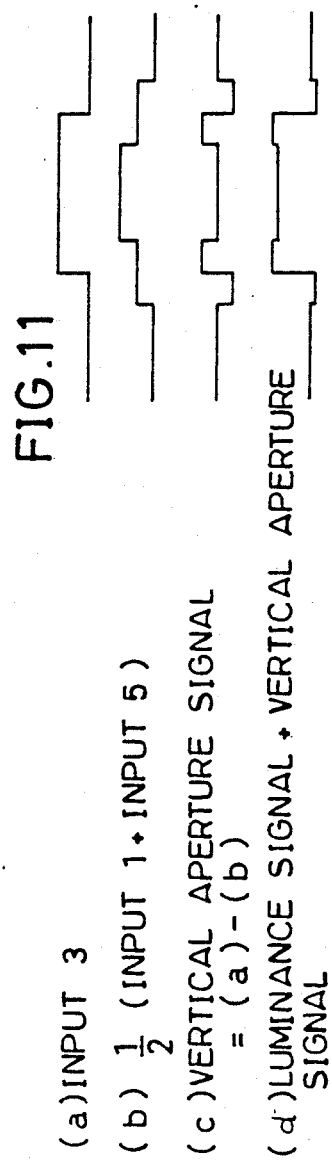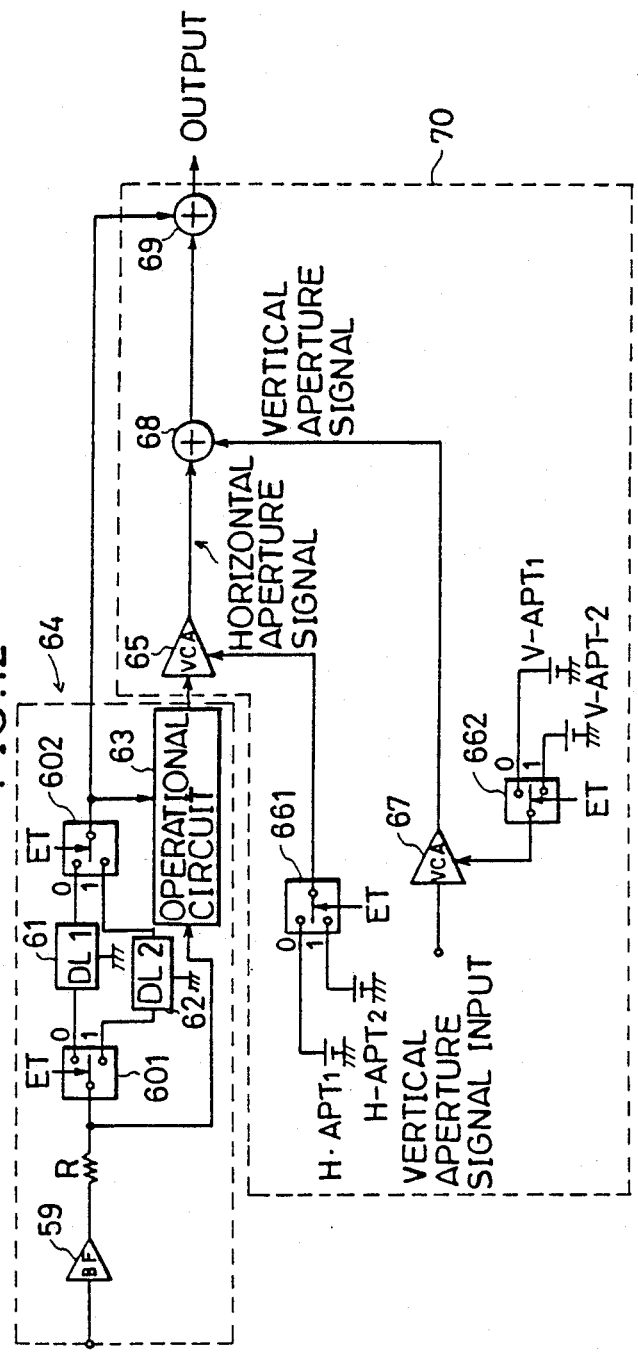

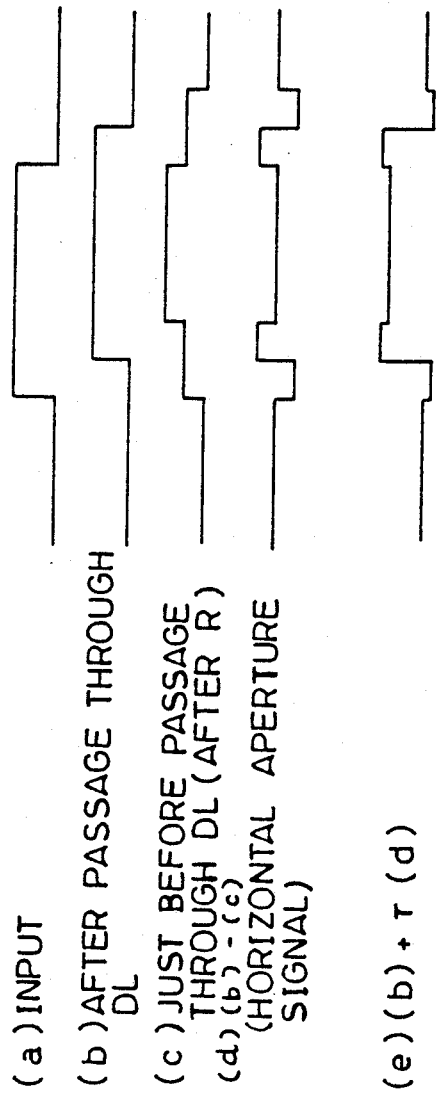

FIG.17

| | T0 | T1 | T2 | T3 | T4 | T5 | T6 | T7 |
|---|---|---|---|---|---|---|---|---|
| C0H | 0.75B0+0.25B1 | 0.5B0+0.5B1 | 0.75R1+0.25R2 | 0.5R1+0.5R2 | 0.75B1+0.25B2 | 0.5B1+0.5B2 | 0.75R2+0.25R3 | 0.5R2+0.5R3 |
| C1H | 0.25R0+0.75R1 | R1 | 0.25B0+0.75B | B1 | 0.25R1+0.75R2 | R2 | 0.25B1+0.75B2 | B2 |
| FH/2 | L | H | L | H | L | H | L | H |
| $\overline{FH/H}$ | H | H | L | L | H | H | L | L |

FIG.19

| | T0 | T1 | T2 | T3 | T4 | T5 | T6 | T7 |
|---|---|---|---|---|---|---|---|---|
| CDH | 0.5R0+0.5R1 | 0.5B0+0.5B1 | 0.5R1+0.5R2 | 0.5B1+0.5B2 | 0.5R2+0.5R3 | 0.5B2+0.5B3 | 0.5R3+0.5R4 | 0.5B3+0.5B4 |
| C1H | B0 | R1 | B1 | R2 | B2 | R3 | B3 | R4 |
| FH/2 | L | H | L | H | L | H | L | H |

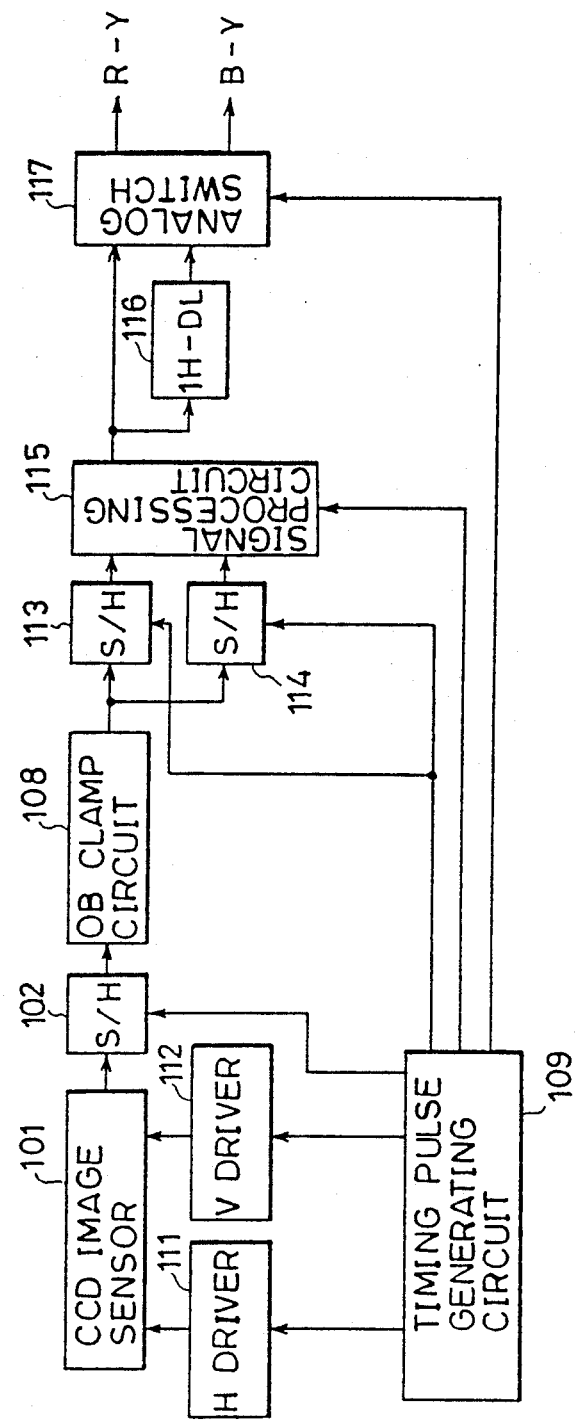

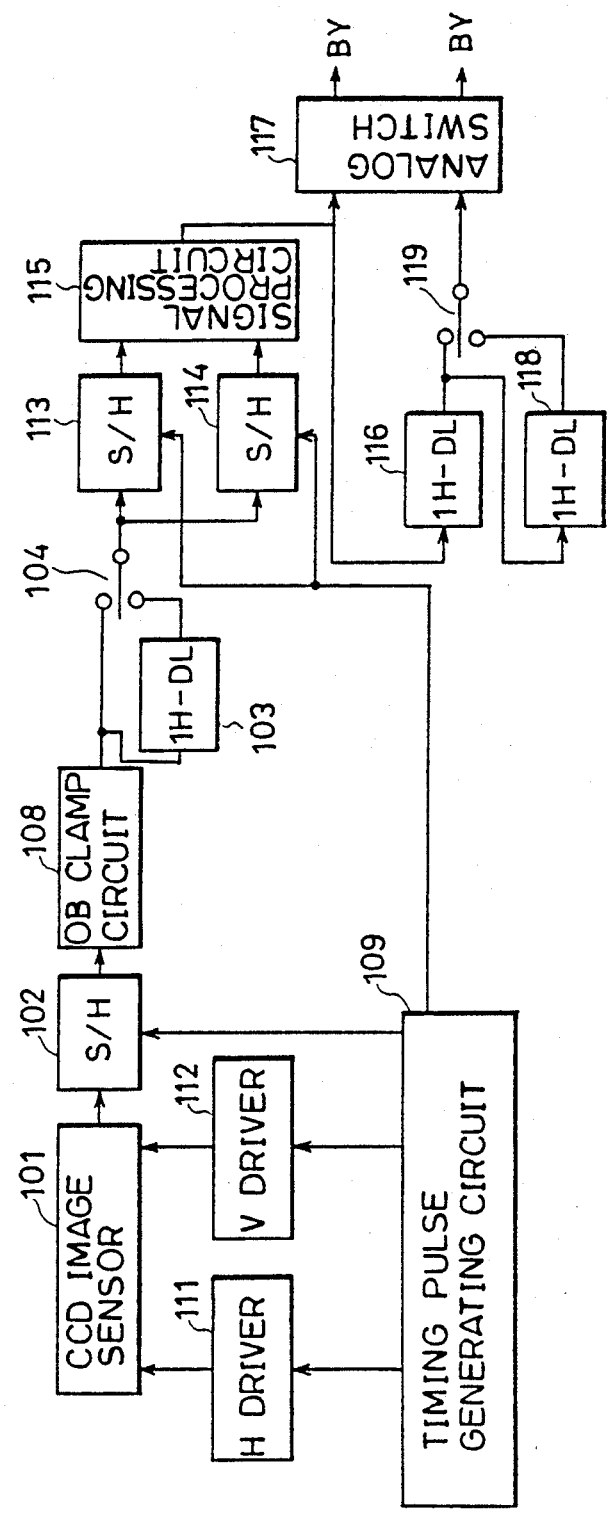

FIG. 27  PRIOR ART

| | | | | | | | | | |
|---|---|---|---|---|---|---|---|---|---|
| C0H | R0 | R0 | B0 | B0 | R1 | R1 | B1 | R2 | |
| C1H | | R0 | B0 | B0 | R1 | B1 | B1 | R2 | R2 |
| C2H | | | R0 | B0 | R1 | R1 | B1 | B1 | R2 |
| R CHANNEL OUTPUT | | | R0 | R1 | R1 | R1 | R1 | R2 | |
| B CHANNEL OUTPUT | | | B0 | B0 | B0 | B1 | B1 | B1 | |

IMAGE PICKUP DEVICE CAPABLE OF PICKING UP IMAGES WHILE ELECTRONICALLY ENLARGING THE SAME

BACKGROUND OF THE INVENTION

1. Field of the Invention

The present invention generally relates to image pickup devices capable of picking up images while electronically enlarging the same. More particularly, the present invention relates to an image pickup device capable of picking up images while electronically enlarging the same which includes a CCD image sensor as an image pickup element and is used, for example, in a video camera or a video tape recorder with a built-in camera.

2. Description of the Prior Art

FIG. 23 is a schematic block diagram showing a conventional image pickup device capable of picking up images while electronically enlarging the same by two times. Referring to the diagram, a timing pulse generating circuit 109 generates a timing pulse for driving a CCD image sensor 101, a signal for controlling an analog switch 104, and several other pulses required for a signal processing circuit 106, in synchronization with synchronizing signals generated from a synchronizing signal generator 110. A switch SW1 for switching between the normal image pickup and the enlarged image pickup is connected to the timing pulse generating circuit 109. The timing pulse generating circuit 109 changes periods of a horizontal transfer pulse and a vertical transfer pulse according to operation of the switch SW1.

The horizontal transfer pulse generated from the timing pulse generating circuit 109 is applied to the CCD image sensor 101 through a horizontal driver 111 and the vertical transfer pulse is applied to the CCD image sensor 101 through a vertical driver 112. Video signals outputted from the CCD image sensor 101 are applied to a sample and hold (S/H) circuit 102 to be sampled and held, and then applied to a 1H delay circuit 103 and the analog switch 104. The 1H delay circuit 103 delays the video signals 1H (one horizontal scanning period) for application to the analog switch 104. The analog switch 104 is responsive to a switching signal from the timing pulse generating circuit 109 for selecting output of either the sample and hold circuit 102 or the 1H delay circuit 103 and applying the selected one to the signal processing circuit 106. The signal processing circuit 106 includes sample and hold circuits, processing circuits and an encoder for converting the video signals from the analog switch 104 into primary color signals R, G and B.

In the conventional image pickup device constituted as described above, when the enlarging image pickup by two times is done with the switch SW1 closed, the timing pulse generating circuit 109 applies the horizontal and vertical transfer pulses that have frequencies half those of the normal image pickup, to the CCD image sensor 101 through the horizontal driver 111 and the vertical driver 112, respectively. Since frequencies of the horizontal and vertical transfer pulses become ½ with respect to those of the normal image pickup, it takes twice the time, or 2H to output charges of one horizontal line in the CCD image sensor 101. Charges corresponding to 1H of the 2H are unnecessary, so that they are replaced by required signals of 1H before they have been delayed by the 1H delay circuit 103. This replacement is effected by the analog switch 104. The unnecessary charges in the vertical direction (corresponding to a ½ area of a standard screen) are deleted by fast vertical transfer performed during a vertical blanking period so that they are not outputted as the video signals from the CCD image sensor 101.

In the image pickup device shown in FIG. 23, the 1H delay circuit 103 may be implemented, for example, as a CCD 1H delay circuit. Since the video signals entered in the signal processing circuit 106 have not yet undergone any processing, however, the signal processing circuit 106 will exhibit a very large dynamic range. On the other hand, such a delay circuit 103 as 1H constituted by a CCD or the like does not have a large dynamic range. Therefore, the use of such an element is impossible and thus miniaturization of the circuit cannot be achieved. Additionally, in the conventional image pickup device shown in FIG. 23, a complementary color filter employed in the CCD image sensor 101 is limited to a vertical stripe filter only, so that a diced filter is unacceptable.

FIG. 24 is a schematic block diagram showing part of a conventional image pickup device for the normal image pickup in which a diced filter is used as the complementary color filter, and FIG. 25 is a diagram showing relationship between line sequential color-difference signals $C_{OH}$ and 1H-delayed $C_{1H}$, an R channel component (R-Y) and a B channel component (B-Y).

In the image pickup device shown in FIG. 24, video signals outputted from a sample and hold circuit 102 are applied to an OB clamp circuit 108 where their optical black level is clamped, and then applied to sample and hold circuits 113 and 114. The sample and hold circuits 113 and 114 separate color components from the video signals to apply them to a signal processing circuit 115. A processed line sequential color-difference signal $C_{OH}$ is applied to a 1H delay circuit 116 and an analog switch 117. The 1H delay circuit 116 delays the line sequential color-difference signal $C_{OH}$ by 1H to obtain a $C_{1H}$ which is applied to the analog switch 117. The analog switch 117 outputs an R channel component (R-Y) and a B channel component (B-Y) out of the line sequential color-difference signals $C_{OH}$ and $C_{1H}$.

In the image pickup device constituted as described above, the CCD image sensor 101 which has a diced filter employed therein outputs a color-difference signal for every 1H line-sequentially. To interpolate the line sequential color-difference signals, the 1H delay circuit 116 and the analog switch 117 are used. The relationship between the line sequential color-difference signals $C_{OH}$ and $C_{1H}$, the R channel component (R-Y) and the B channel component (B-Y), in this case, will be as shown in FIG. 25.

FIG. 26 is a block diagram of the image pickup device shown in FIG. 24 with an additional enlarging image pickup function. FIG. 27 is a diagram showing relationship between the line sequential color-difference signals $C_{OH}$, $C_{1H}$ and $C_{2H}$, the R channel component (R-Y) and the B channel component (B-Y) in the image pickup device shown in FIG. 26.

Referring to FIG. 26, between an OB clamp circuit 108 and sample and hold circuits 113 and 114, there are connected a 1H delay circuit 103 and an analog switch 104. Further, between a 1H delay circuit 116 and an analog switch 117, there are connected a 1H delay circuit 118 and an analog switch 119. The 1H delay circuit 103 and the analog switch 104 are provided for replacing unnecessary charges of 1H by required signals of 1H before in the enlarged image pickup through the same operation as in FIG. 23. The 1H delay circuit 118 and the analog switch 119 are provided to interpolate the color-difference signals in the enlarged image pickup. The relationship between the line-sequential color-difference signals $C_{OH}$, $C_{1H}$ and $C_{2H}$ and the R and B channel components (R-Y) and (B-Y) in such an image pickup device will be as shown in FIG. 27. Meanwhile, in the normal image pickup, the analog switch 119 selects output of the 1H delay circuit 116. Further in the enlarging image pickup, it selects output of the 1H delay circuit 118.

As described above, the image pickup device shown in FIG. 26 allows for the enlarging image pickup as well as the normal image pickup even when a complementary color diced filter is used therein. As will be apparent from FIG. 26, however, provision of three 1H delay circuits is required. When they are implemented as CCD 1H delay circuits, however, costs are too expensive. Further, for a luminance signal, the same signal appears over two lines in the vertical direction, and for the color-difference signal, the same signal appears over four lines. This produces indentation of a diagonal line or a curb and thus a mosaic picture, considerably deteriorating the picture quality.

Furthermore, in the image pickup device with the conventional enlarging image pickup function, the same vertical are horizontal aperture circuits are used in the normal and enlarging image pickups. Since in the enlarging image pickup, however, the same signal appears over two lines in the vertical direction, good contour correction cannot be made if the same vertical aperture circuit is used as is used normal image pickup. Further, since in the enlarging image pickup, the horizontal transfer pulse of the CCD image sensor 101 has a ½ frequency relative to that in the normal image pickup, signal a band becomes ½. Therefore, again good contour correction cannot be made if the same horizontal aperture circuit as in the normal image pickup is used. Additionally, if the same mix amount of aperture is used in the enlarging and the normal image pickups, there arises a problem that proper mix amount cannot be provided for each case.

SUMMARY OF THE INVENTION

An object of the present invention is to provide an image pickup device, capable of picking up electronically enlarged images, which is provided with an n horizontal scanning period delay circuit, adapted only with a provision of n/2 delay circuits, to delay a luminance signal or a color-difference signal by n horizontal scanning periods and interpolate the same.

Another object of the present invention is to provide an image pickup device capable of picking up electronically enlarged images which can improve picture quality in the enlarging image pickup mode by interpolating a luminance signal and a color-difference signal with the use of an n horizontal scanning period delay circuit.

Still another object of the present invention is to provide an image pickup device capable of picking up electronically enlarged images which can produce a horizontal and vertical aperture signals in the enlarging image pickup mode, based on luminance signals delayed by an n horizontal scanning period delay circuit.

A further object of the present invention is to provide an image pickup device capable of picking up electronically expanded images which can eliminate random noises contained in color-difference signals in the normal and the enlarging image pickup modes by making use of color-difference signals delayed by an n horizontal scanning period delay circuit.

Briefly stated, according to the present invention, only with the provision of an n scanning period delay circuit which has n/2 delay circuits connected in series therein, and outputs signals delayed by the delay circuits by 0 to n scanning periods, luminance signals or color-difference signals can be delayed by n horizontal scanning periods, and this means that reduction of the delay circuits in number is possible. Therefore, even if the delay circuits are implemented as CCD 1H delay units, the cost can be kept low.

According to an aspect of the present invention, switching is effected between those signals delayed by an n horizontal scanning period delay circuit by 0, 2, 4 and 6 horizontal scanning periods and luminance signals delayed the same by 3 horizontal scanning periods for every one horizontal scanning period, to output a luminance interpolating signal.

Therefore, according to this aspect of the present invention, the luminance signals can be interpolated by use of the n horizontal scanning period delay circuit, so that picture quality can be improved in the enlarging image pickup mode.

According to a preferred embodiment of the present invention, a carrier component and a higher harmonic component contained in the luminance signal in the normal image pickup mode are eliminated by a first filter. Further, the carrier component and the higher harmonic component contained in the luminance signal in the enlarging image pickup mode are eliminated by a second filter. Accordingly, in the normal image pickup mode, output of the first filter is selected and that of the second filter is selected in the enlarged image pickup mode.

Therefore, according to this preferred embodiment of the present invention, the carrier component and the higher harmonic component contained in the luminance signal, in both the normal and the enlarging image pickup modes are eliminated, so that the picture quality can be improved.

According to another preferred embodiment of the present invention, vertical contour correction of an image is made by operating the luminance signals, delayed by predetermined horizontal scanning periods and outputted from the n horizontal scanning period delay circuit.

Therefore, according to this preferred embodiment of the present invention, a proper picture quality can be obtained through the vertical contour correction of an image.

Further, according to still another preferred embodiment of the present invention, the luminance signals are delayed for production of horizontal contour correcting signals in the normal and the enlarging image pickup modes and the delayed outputs are selected to produce horizontal aperture signals most suitable for the normal and the enlarging image pickup modes, respectively, so that the picture quality can be improved.

According to another preferred embodiment of the present invention, the horizontal aperture signal, the vertical aperture signal and the luminance signal are added together and switched to have their respective optimum levels for making contour correction of an image.

Further, according to another aspect of the present invention, in an image pickup device capable, of picking up images of an object while electronically enlarging the same by two times, relative to the normal image pickup mode includes a solid-state image pickup element having color filters arranged as diced complementary mosaic therein, a combination of the color-difference signals delayed by 0 to n horizontal scanning periods and outputted from the n horizontal scanning period delay circuit are operated, and switching is effected between the respective operation outputs for every one horizontal scanning period to output interpolated color-difference signals.

Therefore, according to this aspect of the present invention, the color-difference signals are interpolated by use of the n horizontal scanning period delay circuit, so that the picture quality can be improved in the enlarging image pickup mode as well as in the normal image pickup mode.

According to a preferred embodiment of the present invention, color-difference signals delayed by 2 horizontal scanning periods and outputted in the normal image pickup mode or color-difference signals delayed by 4 horizontal scanning periods and outputted in the enlarged image pickup mode and undelayed color-difference signals are operated together to suppress noises contained in the color-difference signals, so that the picture quality can be improved.

According to another preferred embodiment of the present invention, in the normal and the enlarging image pickup mode, the carrier component and the higher harmonic component contained in the color-difference signal are eliminated. Thus, the attenuation of the carrier and the higher harmonic components contained in the color-difference signal allows improvement in the picture quality.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a typical waveform chart of the luminance signals each delayed by the 6H delay circuit which is employed for interpolating the luminance signals.

FIG. 6 is a specific block diagram of a luminance signal interpolating circuit.

FIG. 7 is a waveform chart for explaining operation of the luminance signal interpolating circuit.

FIG. 11 is a waveform chart for explaining operation of the vertical aperture circuit in the normal image pickup.

FIG. 12 is a block diagram showing a specific example of a horizontal aperture circuit and an aperture adding circuit.

FIG. 13 is a waveform chart for explaining operation of the horizontal aperture circuit.

FIG. 17 is a diagram showing color-difference signal interpolating methods in the enlarging image pickup mode in a table.

FIG. 19 is a diagram showing output of the color-difference interpolating circuit for every 1H during the timings $T_0$ to $T_7$.

FIG. 24 is a schematic block diagram showing a conventional image pickup device for the normal image pickup mode where a diced filter is used as a complementary color filter.

FIG. 25 is a diagram showing line-sequential color-difference signals and R and B channel components of FIG. 24, in a table.

FIG. 26 is a block diagram showing the image pickup device shown in FIG. 24 with an additional enlarging image pickup function.

FIG. 27 is a diagram showing the line-sequential color-difference signals and the R and the B channel components of FIG. 26, in a table.

DESCRIPTION OF THE PREFERRED EMBODIMENTS

Figure 1:
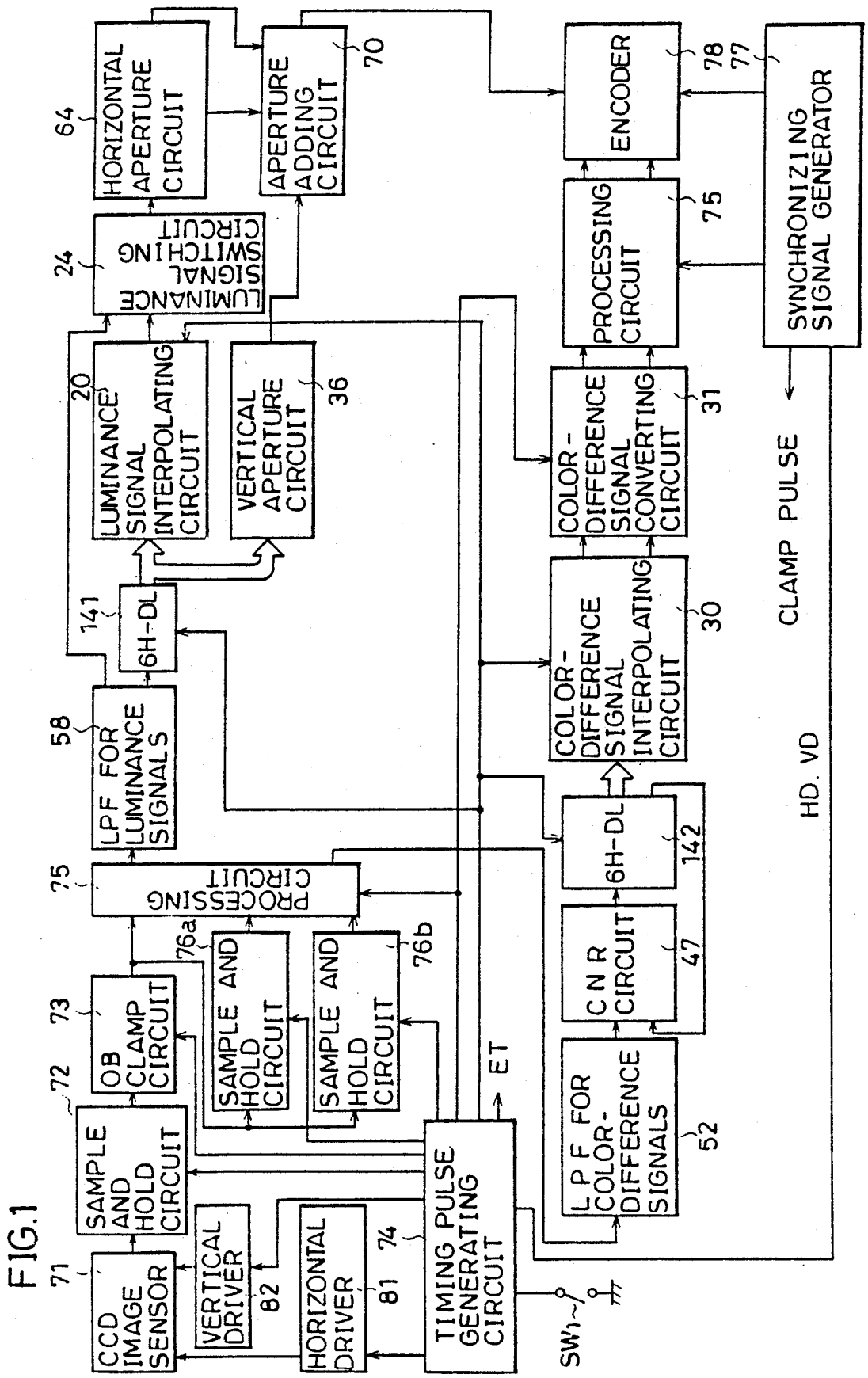
FIG. 1 is a schematic block diagram showing the entire structure of an embodiment of the present invention.

FIG. 1 is a schematic block diagram showing the entire structure of an embodiment of the present invention. Referring to the diagram, the entire structure of an embodiment of the present invention will be described. A timing pulse generating circuit 74 is provided to generate several timing pulses for driving a CCD image sensor 71. The timing pulse generating circuit 74 receives a horizontal drive pulse HD and a vertical drive pulse VD from a synchronizing signal generator 77. Further, a switch SW1 for switching between the normal image pickup mode and the enlarging image pickup mode is connected to the timing pulse generating circuit 74. A horizontal transfer pulse generated from the timing pulse generating circuit 74 is applied to the CCD image sensor 71 through a horizontal driver 81, while a vertical transfer pulse is applied to the CCD image sensor 71 through a vertical driver 82.

An output signal of the CCD image sensor 71 is applied to a sample and hold circuit 72 to be sampled and held in response to a sampling pulse applied thereto from the timing pulse generating circuit 74. The sampled and held video signal is applied to an OB clamp circuit 73. The OB clamp circuit 73 clamps an optical black portion located in the last portion of a horizontal picture element in response to an optical black clamp pulse applied from the timing pulse generating circuit 74 so as to define reference black level (pedestal level) for signal processing. Output of the OB clamp circuit 73 is applied to a processing circuit 75 and sample and hold circuits 76a and 76b. The sample and hold circuits 76a and 76b are responsive to a sampling pulse from the timing pulse generating circuit 74 for separating color signals and applying the thus separated color signals to the processing circuit 75.

The processing circuit 75 is provided to perform signal processings such as AGC, γ correction, white balance, KNEE and ALC. The processing circuit 75 outputs a color-difference signal and a luminance signal and the latter signal is applied to a low-pass filter 58 for luminance signals. The low-pass filter 58 for luminance signals is provided to attenuate a carrier component and a higher harmonic component contained in the luminance signal, corresponding to different frequencies of the horizontal transfer pulses in the normal and the enlarging image pickup mode, respectively. The luminance signals in the normal image pickup mode are applied to a luminance signal switching circuit 24 while they are applied to a 6H delay circuit 141 in the enlarging image pickup mode.

The 6H delay circuit 141 sequentially delays the luminance signals by 0H to 6H periods for output. The delayed luminance signals outputted from the 6H delay circuit 141 are applied to a luminance signal interpolating circuit 20. The luminance signal interpolating circuit 20 is responsive to the delayed luminance signals for outputting and applying interpolated luminance signals to the luminance signal switching circuit 24. The luminance signal switching circuit 24 selects the luminance signals outputted from the low-pass filter 58 for luminance signals in the normal image pickup mode and, in the enlarged image pickup mode, selects the luminance signals having been interpolated by the luminance signal interpolating circuit 20 to apply them to a horizontal aperture circuit 64.

The horizontal aperture circuit 64 produces horizontal aperture signals corresponding to different frequencies of the horizontal transfer pulses and thus to different frequency characteristics of the video signals in the normal and the enlarging image pickup modes, respectively, and applies them to an aperture adding circuit 70. Meanwhile, the luminance signals delayed in the 6H delay circuit 141 are also applied to a vertical aperture circuit 36 which produces vertical aperture signals corresponding to the normal and the enlarging image pickup mode, respectively, and applies them to the aperture adding circuit 70. The aperture adding circuit 70 is provided to change the addition amount of aperture depending on the normal image pickup mode or the enlarging image pickup mode, since characteristics of the vertical and the horizontal aperture signals, and further of the luminance signals before passing through the respective aperture circuits in the normal image pickup mode differ from those in the enlarging image pickup mode.

The color-difference signals outputted from the processing circuit 75 are applied to another low-pass filter 52 for color-difference signals. The low-pass filter 52 for color-difference signals is provided to attenuate a carrier component and a higher harmonic component contained in the color-difference signals and switched corresponding to the normal and the enlarging image pickup modes, respectively, since frequency difference of the horizontal transfer pulse is seen therebetween. The color-difference signals outputted from the low-pass filter 52 for color-difference signals are applied to a CNR circuit 47. The CNR circuit 47 is provided to suppress random noises contained in the color-difference signals and receive color-difference signals sequentially delayed by 2H or 4H and outputted from a following 6H delay circuit 142. The color-difference signals having had the random noises suppressed by the CNR circuit 47 are applied to the 6H delay circuit 142. The 6H delay circuit 142 sequentially delays the color-difference signals by 0H to 6H and applies the delayed ones to a color-difference signal interpolating circuit 30.

The color-differnece signal interpolating circuit 30 is responsive to the color-difference signals having been delayed by 0H to 6H for applying interpolated color-difference signals to a color-difference signal converting circuit 31. The color-difference signal converting circuit 31 converts the interpolated color-difference signals into R-Y signals and B-Y signals and outputs the converted signals to an encoder 78 through the processing circuit 75.

Since in FIG. 1, the CCD image sensor 71, the sample and hold circuit 72, the OB clamp circuit 73, the timing pulse generating circuit 74, the processing circuit 75, the sample and hold circuits 76a and 76b, the horizontal driver 81 and the vertical driver 82 are the same as those in the conventional case, a detailed description thereof will be omitted here. Subsequently, characteristics of each embodiment of the present invention will be described in detail.

Low-pass Filter 58 for Luminance Signals

Figure 2:
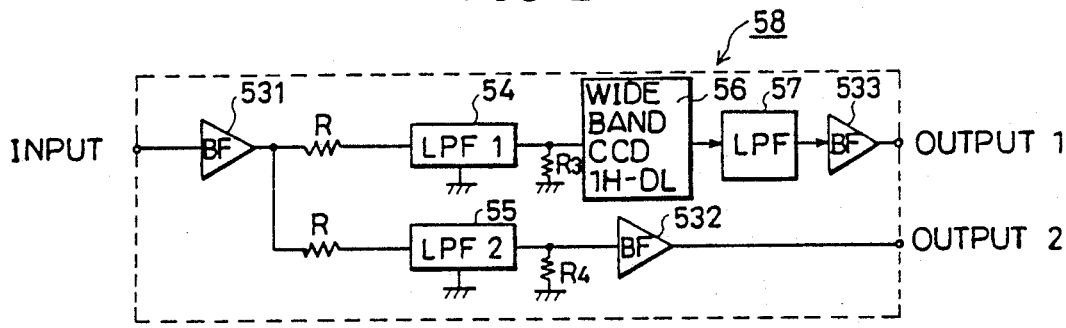
FIG. 2 is block diagram showing a specific example of the low-pass filter for luminance signals shown in FIG. 1.

FIG. 2 is a specific block diagram of a low-pass filter for luminance signals. Referring to the diagram, a low-pass filter 58 for luminance signals is provided to switch a low-pass filter with a trap which attenuates the carrier component and the higher harmonic component contained in the luminance signals, since in the enlarging image pickup mode, frequency of the horizontal transfer pulse becomes ½ of that in the normal image pickup mode. For this purpose, the low-pass filter 58 for luminance signals includes buffers 531, 532, and 533, low-pass filters 54 and 55, a wide-band CCD 1H delay circuit 56 and a low-pass filter 57, as shown in FIG. 2. Luminance signals are applied to the low-pass filters 54 and 55 through the buffer 531. The low-pass filter 54 is one with a trap for the normal image pickup mode and the low-pass filter 55 is one with a trap for the enlarging image pickup mode. Output of the low-pass filter 54 is applied to the wide-band CCD 1H delay circuit 56 where it is delayed by 1H so as to correspond to delay time of the color-difference signals. The luminance signals delayed in the wide-band CCD 1H delay circuit 56 are outputted through the low-pass filter 57 with a trap for attenuating the clock and the higher harmonic components, and through the buffer 533 to be further applied to the luminance signal switching circuit 24 shown in FIG. 1. Output of the low-pass filter 55 is applied to a 6H delay circuit 141 through the buffer 532.

6H Delay Circuit 141

Figure 3:
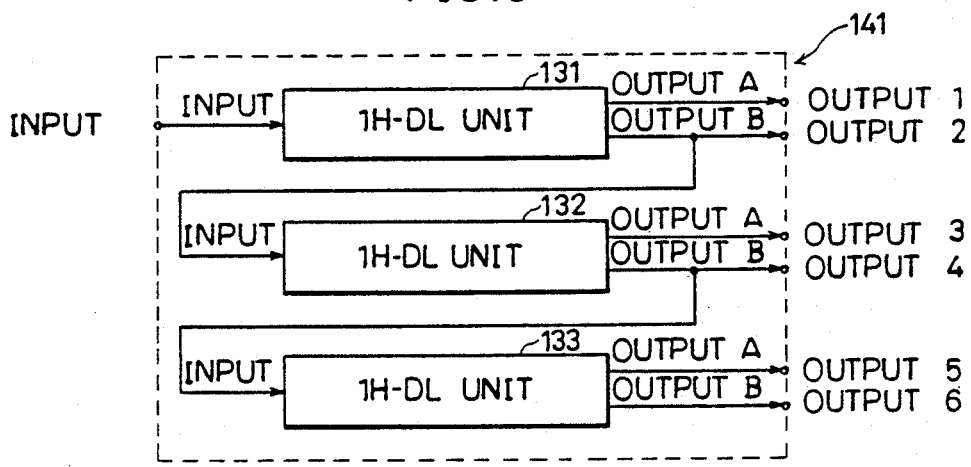
FIG. 3 is a schematic block diagram of a 6H delay circuit.
Figure 4:
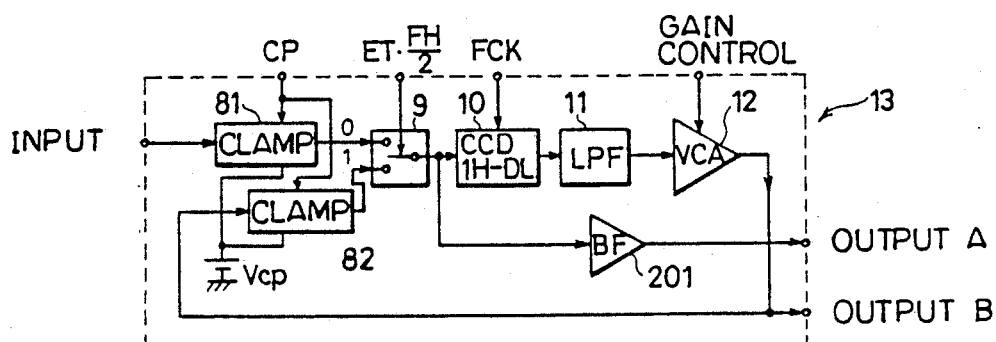
FIG. 4 is a specific block diagram of a 1H delay unit constituting a 6H delay circuit.

FIG. 3 is a block diagram showing the entire structure of a 6H delay circuit and FIG. 4 is a specific block diagram of a 1H delay unit constituting the 6H delay circuit.

Referring to FIG. 3, the 6H delay circuit 141 includes three 1H delay units 131, 132 and 133 each of which includes outputs A and B. Each output B is connected to the 1H delay unit in the subsequent stage, so that the three 1H delay units 131, 132 and 133 are connected to each other in series.

Each of the 1H delay units 131, 132 and 133 comprises clamp circuits 81 and 82, an analog switch 9, a CCD 1H delay circuit 10, a low-pass filter 11, a voltage control amplifier (VCA) 12 and a buffer 201, as shown in FIG. 4. Luminance signals are applied to the clamp circuit 81. The clamp circuit 81 is provided to fix the black level of the signals to be entered in the analog switch 9 at reference voltage $V_{CP}$. Without this clamp circuit 81, there appears difference in the black level of outputs at a common output terminal of the analog switch 9 between one 1H and. This equivalently increases the input amplitude of the CCD 1H delay circuit 10, resulting in a reduction in the dynamic range. The clamp circuit 82 is provided also for the same reason and clamps output of the VCA 12.

Outputs of the clamp circuits 81 and 82 are applied to the analog switch 9. The analog switch 9 is switched by an $ET \cdot F_H/2$ pulse outputted from the timing pulse generating circuit 74 shown in FIG. 1. When this $ET \cdot F_H/2$ pulse turns to the "L" level in the normal image pickup mode, the analog switch 9 selects input 0, or output of the clamp circuit 81. On the other hand, in the enlarging image pickup mode, when the $ET \cdot F_H/2$ pulse turns to the "L" level, the analog switch 9 selects input 0, or output of the clamp circuit 81 and when the same attains the "H" level, it selects input 1, or output of the clamp circuit 82 for every 1H. The common terminal output of the analog switch 9 is outputted through the buffer 201 as output A and at the same time, applied to the CCD 1H delay circuit 10. The CCD 1H delay circuit 10 is provided to delay the common terminal output of the analog switch 9 by 1H, output the of which is applied to the low-pass filter 11. The low-pass filter 11 is provided to attenuate a clock signal $F_{CK}$ component and a higher harmonic component applied to the CCD 1H delay circuit 10. Output of the low-pass filter 11 is applied to the VCA 12. The VCA 12 changes gain according to a gain control signal so that the output B may have an amplitude equal to that of the input signal. In this manner, with the use of the clamp circuits 81 and 82 and the VCA 12, outputs that are consistent in the black level and amplitude from 1H to another can be obtained at the outputs A and B.

Subsequently, operation of the 6H delay circuit will be described. In the enlarging image pickup mode, an effective component and an ineffective component of the luminance signal are alternately outputted, one for every 1H. When the $ET \cdot F_H/2$ pulse which is a 2H period pulse, or inverted between the "H" level and the "L" level for every 1H is applied in the enlarging image pickup mode, the analog switch 9 outputs an input signal as is, for the output A when the $ET \cdot F_H/2$ is at the "L" level, and outputs a signal which has been outputted just 1H before at the output A for the output B. Furthermore, when the $ET \cdot F_H/2$ signal is at the "H" level, the same signal as at the output B is outputted at the output A, while at the output B, a signal which has been obtained only by delaying the signal of the output A by 1H is outputted.

Meanwhile, in the normal image pickup mode, a control terminal of the analog switch 9 is fixed at the "L" level, so that an input signal of the 1H delay unit 13 is outputted as it is at the output A and another input signal which has preceded the former by 1H is outputted at the output B.

FIG. 5 is a timing chart showing the delayed luminance signals outputted from the 6H delay circuit. The luminance signal outputted from the low-pass filter 58 for luminance signals in the enlarging image pickup mode includes effective components (shown by 0 through 11) and ineffective components (shown by x), as shown in FIG. 5 (b). When the $ET \cdot F_H/2$ pulse is at the "L" level, the effective components are entered and when the same is at the "H" level, the ineffective components are entered. Now, taking notice of the signal "0" shown in FIG. 5 (b), a signal "0" delayed by 1H with respect to the output 1 is outputted to the output 2 of the 6H delay circuit 141, while the signal "0" is also outputted to the output 1 through the analog switch 9. Further, this "0" signal is delayed by 1H and outputted to the output 2. Therefore, the signal "0" is outputted to the output 2 after 2H from the first output of the signal "0" at the output 1, so that 0H (an undelayed signal) and 2H (a signal delayed by 2H) appear at the outputs 1 and 2 at a time (only if the $ET \cdot F_H/2$ pulse is at the "L" level).

This means in the enlarging image pickup mode, a single 1H delay unit can be used as a 2H delay circuit. Therefore, as shown in FIG. 3, a 6H delay circuit can be constituted by connecting three 1H delay units 131, 132 and 133 in series. Thus a considerable reduction in cost can be achieved as compared with a case where as many as six relatively expensive CCD 1H delay units are simply connected to each other. This 6H delay circuit 141 is connected to the luminance signal interpolating circuit 20 which outputs interpolated luminance signals, as will be described in the following.

Luminance Signal Interpolating Circuit 20

FIG. 6 is a specific block diagram showing a luminance signal interpolating circuit. Referring to FIG. 6, the luminance signal interpolating circuit 20 comprises four clamp circuits 151, 152, 153 and 154, which receive the output signals 1, 3, 5 and 6 of the 6H delay circuit 141 as input signals 1, 2, 3 and 4, respectively. Outputs of the clamp circuits 151 and 154 are applied to an adding and averaging circuit 161 where they are added together and averaged before further applied to one input terminal of an operational amplifier 17. Outputs of the clamp circuits 152 and 153 are applied to another adding and averaging circuit 152 where an addition average thereof is also produced to be further applied to the other input terminal of the operational amplifier 17. Further, the output of the clamp circuit 152 is also applied to a VCA 18 which is responsive to a gain control signal for controlling gain. Outputs of the operational amplifier 17 and the VCA 18 are applied to an analog switch 19. The analog switch 19 selects the output of the operational amplifier 17 when the $ET \cdot F_H/2$ pulse turns to "L" level and selects the output of the VCA 18 when the same attains the "H" to output an interpolated luminance signal.

FIG. 7 is a timing chart for explaining operation of the luminance signal interpolating circuit 20 shown in FIG. 6. Referring to this chart, operation of the luminance signal interpolating circuit 20 shown in FIG. 6 will be described. The adding and averaging circuit 161 adds and averages the input signals 1 and 4 which have been clamped by the clamp circuits 151 and 154, as shown in FIG. 7 (b). On the other hand, the other adding and averaging circuit 162 adds and averages the input signals 2 and 3 which have been clamped by the clamp circuits 152 and 153, as shown in FIG. 7 (a). The operational amplifier 17 increases output of the adding and averaging circuit 162 by $\alpha$ times and that of the adding and averaging circuit 161 by $\beta$ times, to output such a signal as shown in FIG. 7 (c). Further, the input signal 2 having been clamped by the clamp circuit 152 is controlled by the VCA 18 for its gain. The analog switch 19 selects either output of the operational amplifier 17 or that of the VCA 18 for every 1H to output an interpolated luminance signal as shown in FIG. 7 (d).

According to the above-mentioned interpolating method, an interpolating signal is produced based on adjacent two sets of two sequential effective signals, or four effective signals in total. Therefore, when cubic curve interpolation is made, $\alpha \approx 1.12$ and $\beta \approx 0.12$ are selected. Meanwhile, when all the four effective components have the same waveform, or vertical correlation is found therebetween, gain of the VCA 18 is adjusted so that the interpolating signal and the input signal 2 have the same waveform, whereby amplitude difference in the interpolated outputs between one 1H and another will be eliminated.

Luminance Signal Switching Circuit 24

Figure 8:
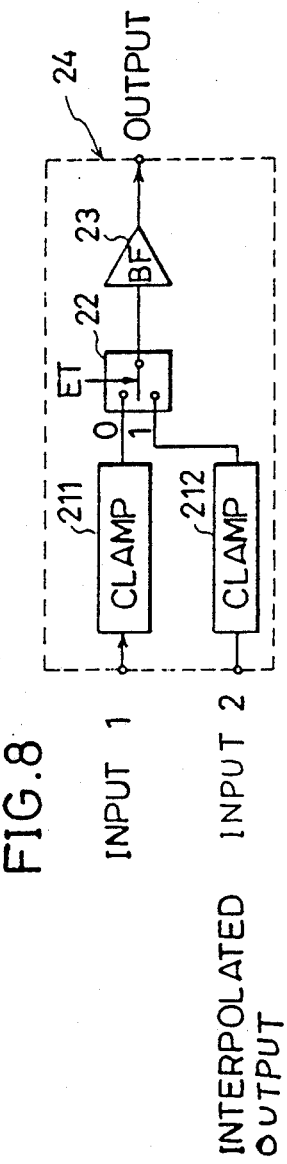
FIG. 8 is a specific block diagram of a luminance signal switching circuit.

FIG. 8 is a specific block diagram of a luminance signal switching circuit. Referring to the diagram, a luminance signal switching circuit 24 will be described. Luminance signals outputted from the low-pass filter 58 for luminance signals in the normal image pickup mode are applied to one input terminal of an analog switch 22 through a clamp circuit 211. The luminance signals that have been interpolated by the luminance signal interpolating circuit 20 are applied to the other input terminal of the analog switch 22 through another clamp circuit 212. When a select signal ET turns to the "L" level in the normal image pickup mode, the analog switch 22 selects output of the clamp circuit 211 to apply the same to the horizontal aperture circuit 64 shown in FIG. 1 through a buffer 23. When the select signal ET attains the "H" level in the enlarging image pickup mode, the analog switch 22 outputs an interpolated luminance signal which is applied through the clamp circuit 212.

Vertical Aperture Circuit 36

Figure 9:
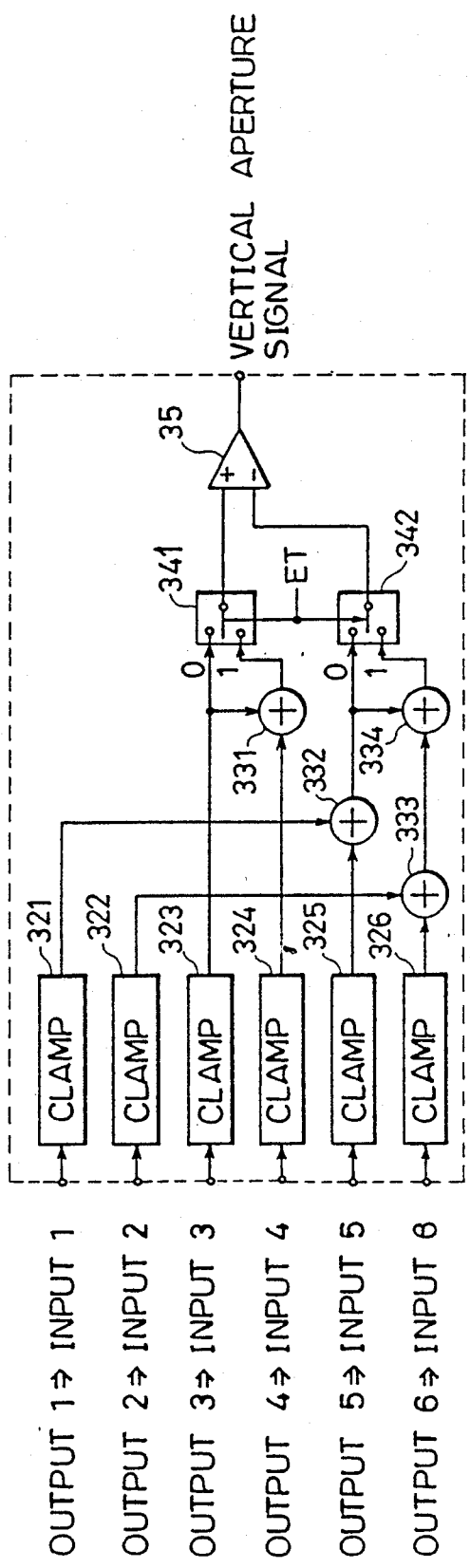
FIG. 9 is a block diagram showing a specific example of a vertical aperture circuit.

FIG. 9 is a specific block diagram of a vertical aperture circuit. As described above, a luminance signal which has been delayed by the 6H delay circuit 141 in the enlarging image pickup mode will be as shown in FIG. 5, resulting in the interpolated output shown in FIG. 7 (d) after passing through the luminance signal interpolating circuit shown in FIG. 6. Since this interpolated output is a smooth one with its folded distortion in a high range (for example, indentation of a diagonal line) attenuated, a vertical aperture circuit 36 as shown in FIG. 9 is required.

The vertical aperture circuit 36 includes clamp circuits 321 to 326 for receiving the output signals 1 to 6 of the luminance signals delayed by the 6H delay circuit 141, adding an averaging circuits 331 to 334, analog switches 341 and 342 and an operational amplifier 35.

The clamp circuits 321 to 326 receive the output signals 1 to 6 of the luminance signals delayed by the 6H delay circuit 141 as input signals 1 to 6, respectively, and clamp the received signals. The adding and averaging circuit 331 adds and averages the input signals 3 and 4 that have been clamped in the clamp circuits 323 and 324 to apply such a signal as shown in FIG. 10 (a) to the 1 input terminal of the analog switch 341, while 0 the input terminal of the same receives the input 3 which has been clamped in the clamp circuit 323.

Figure 10:
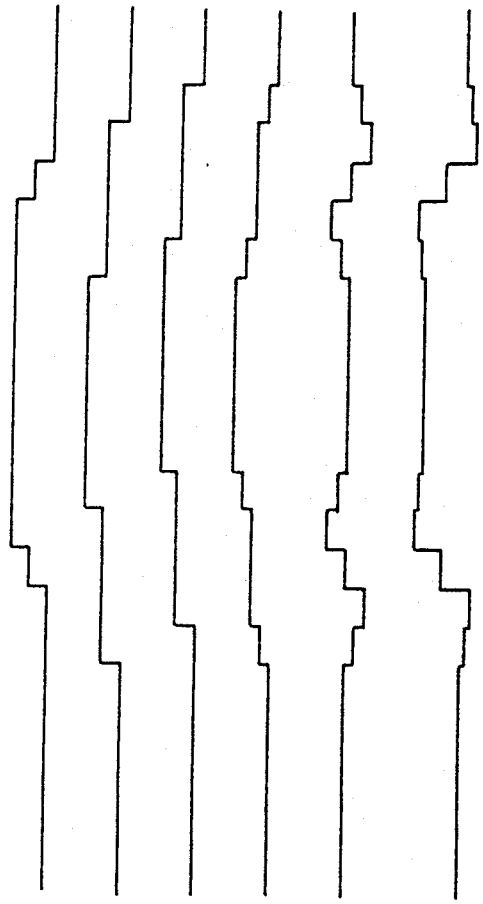
FIG. 10 is a waveform chart for explaining operation of the vertical aperture circuit.

The adding and averaging circuit 332 adds and averages the input signals 1 and 5 that have been clamped in the clamp circuits 321 and 325 to apply such a signal as shown in FIG. 10 (b) to the adding and averaging circuit 334 and 0 the input terminal of the analog switch 342. The adding and averaging circuit 333 adds and averages the input signals 2 and 6 that have been clamped in the clamp circuits 322 and 326 to apply such a signal as shown in FIG. 10 (c) to the adding and averaging circuit 334. The adding and averaging circuit 334 adds and averages outputs of the adding and averaging circuit 332 and 333 to apply the result to the 1 input terminal of the analog switch 342. The analog switches 341 and 342 are set to the side of the the 0 input terminals when a select signal ET turns to the "L" level in the normal image pickup mode, and set to the side of the 1 input terminals when the same attains the "H" level in the enlarging image pickup mode. The signals that have been selected by the analog switches 341 and 342 are applied to the operational amplifier 35. The operational amplifier 35 is a simple subtracter which subtracts a signal applied to an inversion input terminal from another signal applied to a non-inversion input terminal and outputs a vertical aperture signal as shown in FIG. 10 (e).

In the enlarging image pickup mode, the analog switches 341 and 342 are switched to the side of the 1 input terminals and a signal having such a waveform as shown in FIG. 10 (e) is outputted as a vertical aperture signal. On the other hand, in the normal image pickup mode, the vertical aperture circuit 36 operates as a so-called 2H enhancer circuit and outputs such a signal as shown in FIG. 11 (c).

Now, relationship between the above-mentioned luminance signal interpolating circuit 20 and the vertical aperture circuit 36 will be described. In producing interpolated luminance signals, frequency characteristic of the luminance signals can be changed by providing the operational amplifier 17 shown in FIG. 6 with an amplification factor of gain distributions ($\alpha$, $\beta$). Assuming for example that $\alpha \approx 1.5$ and $\beta \approx 0.5$, the frequency characteristic of the interpolated output can include a peak in a high range. Turning to waveform of the interpolated output, however, this results in only expanded projections of undershoot and overshoot. In the example shown in FIG. 7, 3H between the undershoot and the overshoot forms a smooth line with one projecting 1H on both sides, which leads to too small a thickness of image contour. Additionally, too large differences of the 3H periods between the respective outputs will render the image picture unnatural. Furthermore, when the vertical aperture signals of the vertical aperture circuit 36 are mixed with the horizontal aperture signals, the image contour becomes in turn too thick. The degree of the thickening, of course, depends on the mixture amount, thereby providing a poor image picture. Accordingly, it is desirable to set the gain distribution in the luminance signal interpolating circuit 20 to $\alpha \approx 1.12$ and $\beta \approx 0.12$ as described above, to attain the-a flattest frequency characteristic of the interpolated output and then mix the interpolated output with the vertical aperture signals (see FIG. 10 (f)).

Horizontal Aperture Circuit 64 and Aperture Adding Circuit 70

FIG. 12 is a specific block diagram of a horizontal aperture circuit and an aperture adding circuit, and FIG. 13 is a timing chart for explaining operation of the horizontal aperture circuit.

Since in the enlarging image pickup mode, frequency of the horizontal transfer pulse becomes ½ with respect to that in the normal image pickup mode and this leads to difference in frequency characteristic of the video signals, a horizontal aperture circuit is required to be constituted correspondingly. As such, a horizontal aperture circuit 64 comprises a buffer 59, analog switches 601 and 602, delay circuits 61 and 62 and an operational circuit 63. The luminance signals, having been switched by the luminance signal switching circuit 24, are entered into the buffer 59 to be further applied to a common terminal of the analog switch 601 and to the operational circuit 63.

The analog switch 601 is responsive to a select signal ET for being switched to apply the luminance signals to the delay circuit 61 in the normal image pickup mode and to the delay circuit 62 in the enlarging image pickup mode. The delay circuit 61 serves as a delay circuit for horizontal aperture in the normal image pickup mode and the delay circuit 62 serves as a delay circuit for horizontal aperture in the enlarging image pickup mode. Output of the delay circuit 61 or 62 is selected by the analog switch 602 in response to the select signal ET to be further applied to the operational circuit 63 and to the aperture adding circuit 70.

Subsequently, referring to FIG. 12, operation for producing the horizontal aperture signals will be described. A luminance signal shown in FIG. 13 (a) is entered in the horizontal aperture circuit 64. In the enlarging image pickup mode, the luminance signal is applied to the delay circuit 62 to be delayed by a predetermined time as shown in FIG. 13 (b). Generally, each of the delay circuits 61 and 62 includes a coil and a condenser and has a terminating resistor connected thereto for preventing reflection. In this embodiment, however, no terminating resistor is employed so that the reflection can be utilized. To generate the reflection, a luminance signal just before passing through the delay circuit 62 take a waveform as shown in FIG. 13 (c). The operational circuit 63 subtracts the luminance signal before passing through the delay circuit 62 from the luminance signal having passed therethrough, to output such a horizontal aperture signal as shown in FIG. 13 (d). This horizontal aperture signal is applied to the aperture adding circuit 70. The aperture adding circuit 70 adds the luminance signal having passed through the delay circuit 62 and the horizontal aperture signal together to output a signal as shown in FIG. 13 (e).

Subsequently, referring to FIG. 12, the aperture adding circuit 70 will be described. Since the vertical aperture signal from the vertical aperture circuit 36, the horizontal aperture signal from the horizontal aperture circuit 64, and further the luminance signal before passing through aperture have different characteristics between the normal image pickup mode and the enlarging image pickup mode, the mixture amount for contour correction should be changed corresponding to the normal and the enlarging image pickup modes. Therefore, the aperture adding circuit 70 is adapted to change the mixture amount for contour correction.

The aperture adding circuit 70 includes a VCA 65 for adjusting gain of the horizontal aperture signal, another VCA 67 for adjusting gain of the vertical aperture signal, adders 68 and 69, and analog switches 661 and 662 for switching gains corresponding to the normal and the enlarging image pickup modes. The analog switch 661 is responsive to a select signal ET for selecting a horizontal aperture voltage corresponding to the normal image pickup mode or to the enlarging image pickup mode to apply the same to the VCA 65.

Meanwhile, the analog switch 662 is responsive to the select signal ET for selecting a vertical aperture voltage corresponding to the normal image pickup mode or the enlarging image pickup mode to apply the same to the VCA 67. The VCA 65 adjusts gain of the horizontal aperture signal according to the thus applied horizontal aperture voltage, and the VCA 67 adjusts gain of the vertical aperture signal according to the thus applied vertical aperture voltage. The horizontal and vertical aperture signals having their respective gains adjusted are added together by the adder 68 the output of which is further added to a luminance signal by the adder 69 and then outputted to the encoder 78 shown in FIG. 1.

While in the foregoing structure and operation of the luminance signal system has been described, those of the color-difference signal system will be described in the following.

Low-Pass Filter 52 for Color-Difference Signals

Figure 14:
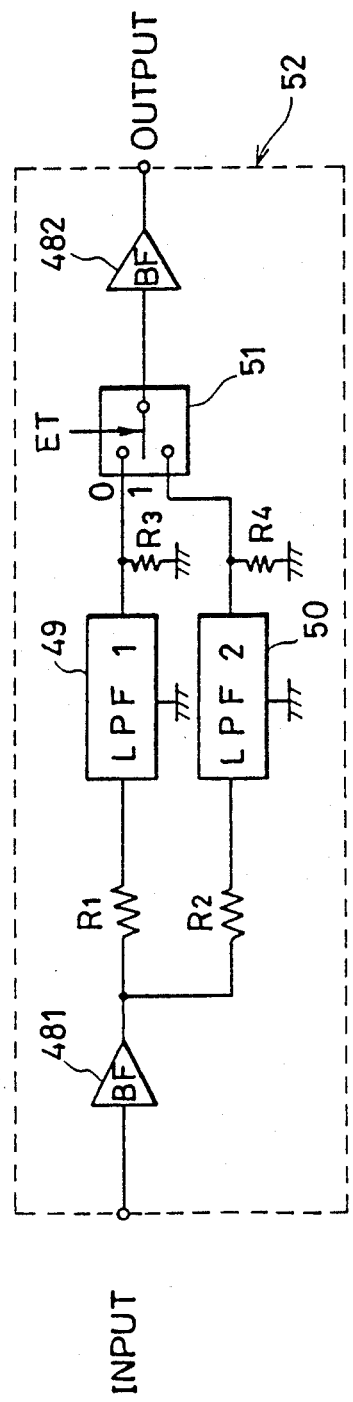
FIG. 14 is a block diagram showing a specific example of a low-pass filter for color-difference signals.

FIG. 14 is a specific block diagram of the low-pass filter 52 for color-difference signals shown in FIG. 1. Since frequency of the horizontal transfer pulse in the enlarging image pickup mode becomes ½ with respect to that in the normal image pickup mode, switching of a low-pass filter with a trap which attenuates a carrier component and a higher harmonic component contained in the color-difference signal is required in the same manner as in the luminance signal system. For this purpose, the low-pass filter 52 for color-difference signals is provided. The low-pass filter 52 for color-difference signals includes buffers 481 and 482, low-pass filters 49 and 50 and an analog switch 51.

The color-difference signals outputted from the processing circuit 75 are applied to the low-pass filters 49 and 50 through the buffer 481. The low-pass filter 49 serves as a filter with a trap in the normal image pickup mode and the low-pass filter 50 serves as a filter with a trap in the enlarging image pickup mode. The analog switch 51 is responsive to a select signal ET for selecting output of the low-pass filter 49 in the normal image pickup mode and that of the low-pass filter 50 in the enlarging image pickup mode. The selected color-difference signal is applied to the CNR circuit 47 through the buffer 482.

Figure 15:
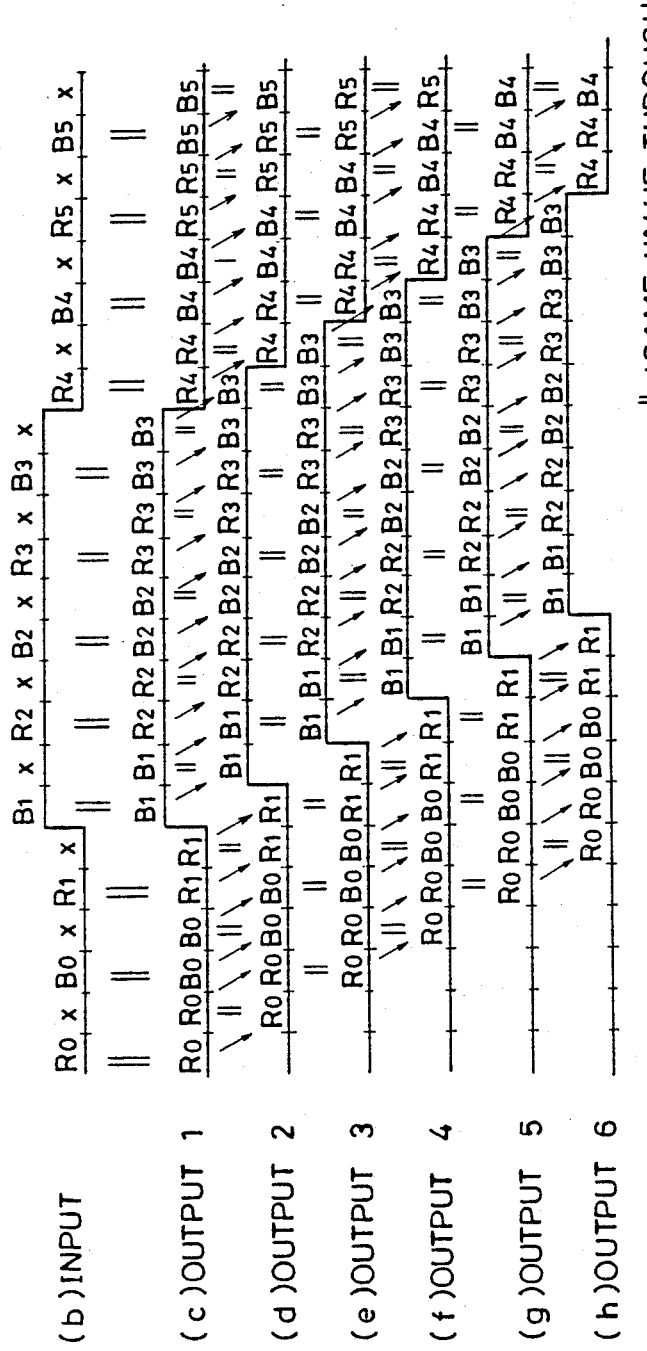
FIG. 15 is a typical waveform chart of the color-difference signals sequentially delayed by the 6H delay circuit.

FIG. 15 is a diagram schematically showing waveforms of the respective color-difference signals that have been delayed by the 6H delay circuit in the enlarging image pickup mode. The 6H delay circuit 142 shown in FIG. 1 is constituted in the same manner as the above mentioned 6H delay circuit 141 shown in FIGS. 3 and 4 which delays luminance signals. When a color-difference signal as shown in FIG. 15 (b) is applied to the input of the 6H delay circuit 142, such signals as shown in FIGS. 15 (c) to (h) are delayed and outputted as output signals 1 to 6. When the ET·$F_H$/2 pulse shown in FIG. 15 (a) is at the "L" level, effective components ($R_0$, $B_0$, $R_1$ ... $B_5$ ...) are entered, and when the same is at the "H" level, signals that will be regarded as ineffective components (x) are entered. What is different from the luminance signal case, is that the R channel component and the B channel component are line-sequentially entered. For example, in case of the R channel component, "$R_1$" following "$R_0$" appears 4H later.

Color-Difference Signal Interpolating Circuit 30

Figure 16:
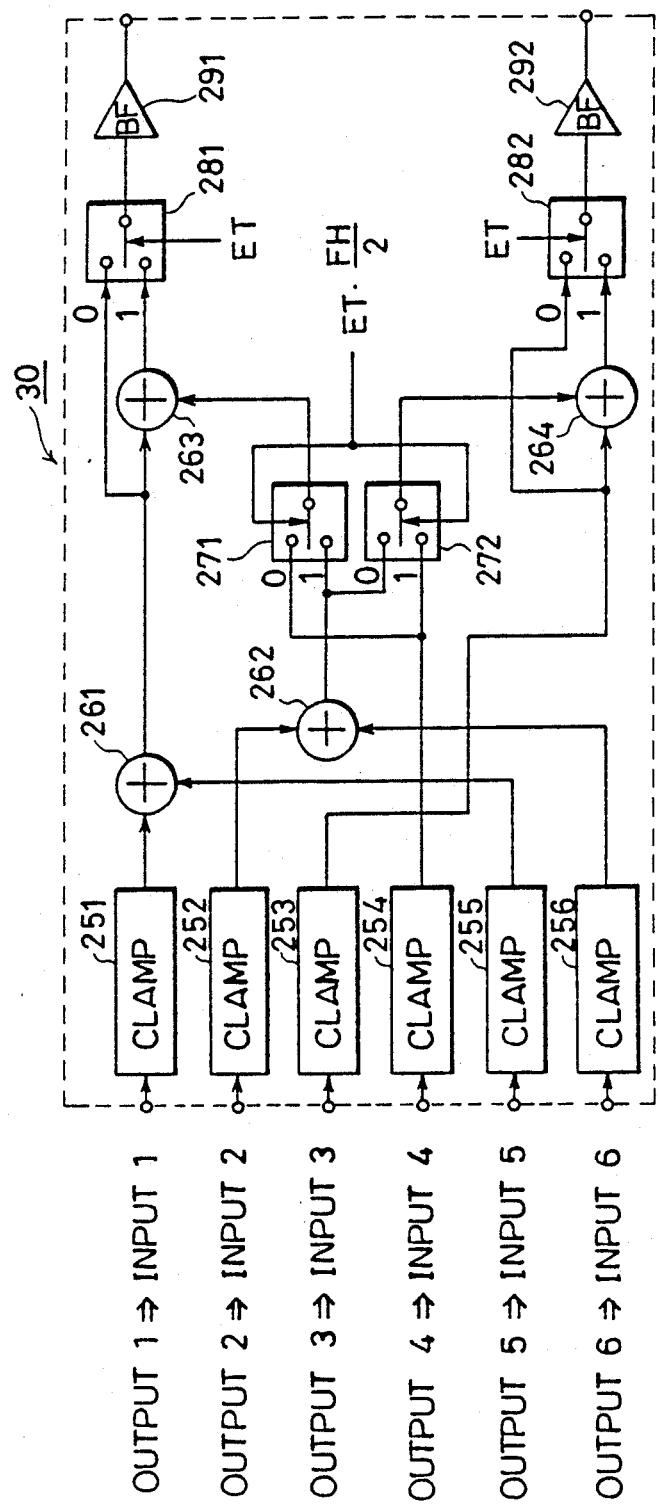
FIG. 16 is a block diagram showing a specific example of a color-difference signal interpolating circuit.

FIG. 16 is a specific block diagram of a color-difference signal interpolating circuit 30. The color-difference signal interpolating circuit 30 includes clamp circuits 251 to 256 which receive the output signals 1 to 6 of the 6H delay circuit 142 as input signals 1 to 6, respectively. Outputs of the clamp circuits 251 and 255 are added together and averaged by an adding and averaging circuit 261 and the result is applied to another adding and averaging circuit 263. Outputs of the clamp circuits 252 and 256 are added together and averaged by another adding and averaging circuit 262 output of which is applied to the 1 input terminal of an analog switch 271 and the 0 input terminal of another analog switch 272. The 0 input terminal of the analog switch 271 and the 1 input terminal of the analog switch 272 receive output of the clamp circuit 254. The analog switches 271 and 272 are switched in response to the ET·$F_H$/2 pulse.

A color-difference signal selected by the analog switch 271 is applied to the adding an averaging circuit 263 to be added to and averaged with the output of the adding and averaging circuit 261, and then applied to the 1 input terminal of another analog switch 281. The 0 input terminal of the analog switch 281 receives the output of the adding and averaging circuit 261. The analog switch 281 is responsive to a select signal ET for selecting the output of the adding and averaging circuit 261 in the normal image pickup mode, and selects that of the adding and averaging circuit 263 in the enlarging image pickup mode, to output the selected one through the buffer 291 as a $C_{OH}$ signal.

A color-difference signal selected by the analog switch 272 is applied to another adding an averaging circuit 264. The adding and averaging circuit 264 adds and averages outputs of the analog switch 272 and the clamp circuit 253, and applies the result to the 1 input terminal of another analog switch 282. The 0 input terminal of the analog switch 282 receives the output of the clamp circuit 253. The analog switch 282 is responsive to the select signal ET for selecting the output of the clamp circuit 253 in the normal image pickup mode and selects that of the adding and averaging circuit 264 in the enlarging image pickup mode, to output the selected one through the buffer 292 as a $C_{1H}$ signal.

FIG. 17 is a diagram showing the $C_{OH}$ signal and the $C_{1H}$ for every 1H between the timings $T_0$ and $T_7$ shown in FIG. 15 in a table. Referring to FIG. 17, for example at the timing $T_2$, the adding and averaging circuit 261 outputs $(R_1+R_2)/2$ and the adding and averaging circuit 262 outputs $(B_0+B_1)/2$. Further, the adding and averaging circuit 263 outputs $\{(R_1+R_2)/2+R_1\}/2=0.75R_1+0.25R_2$, and the adding and averaging circuit 264 outputs $\{(B_0+B_1)/2+B_1\}/2=0.25B_0+0.75B_1$.

Figure 18:
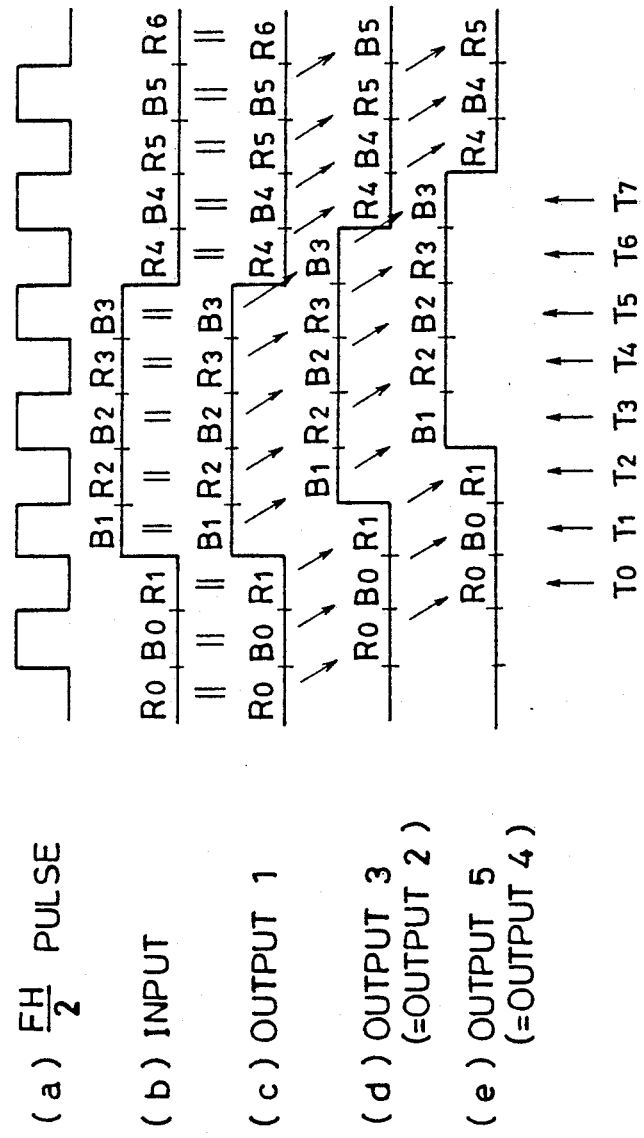
FIG. 18 is a typical waveform chart of the color-difference signals outputted from the 6H delay circuit in the normal image pickup mode.

FIG. 18 is a diagram showing timings at which the $C_{OH}$ and the $C_{1H}$ are outputted from the color-difference signal interpolating circuit 30 in the normal image pickup mode. FIG. 19 is a diagram showing the $C_{OH}$ and $C_{1H}$ for every 1H between the timings $T_0$ and $T_7$.

In the normal image pickup mode, the select signal ET turns to the "L" level, so that the analog switches 271, 272, 281 and 282 shown in FIG. 16 are placed to the side of the the 0 input terminals. Therefore, for example at the timing $T_2$, the adding and averaging circuit 261 adds and averages the outputs $R_2$ and $R_1$ of the clamp circuits 251 and 255 to obtain $(R_1+R_2)/2$. This is eventually outputted as the output $C_{OH}=0.5\ R_1+0.5\ R_2$ through the analog switch 281 and the buffer 291.

Meanwhile, the analog switch 282, which has been placed to the side of the the 0 input terminal, outputs the output $B_1$ of the clamp circuit 253 as it is, or as $C_{1H}=B_1$ through the buffer 292.

Color-Difference Signal Converting Circuit 31

Figure 20:
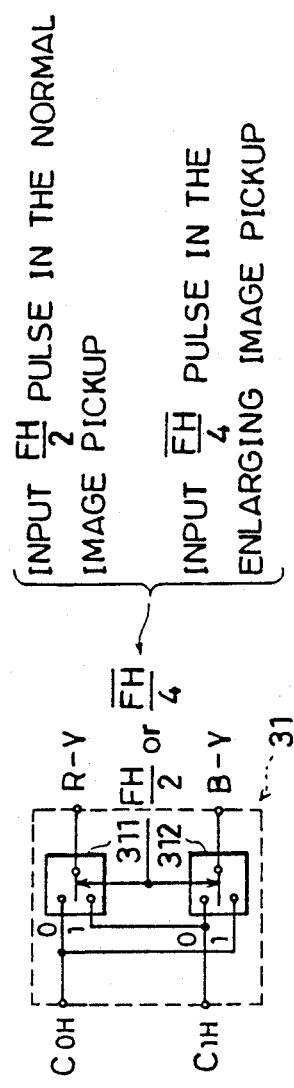
FIG. 20 is block diagram showing a color-difference signal switching circuit.

FIG. 20 is a diagram showing a color-difference signal converting circuit. Referring to the diagram, a color-difference signal converting circuit 31 includes analog switches 311 and 312. The 0 input terminal of the analog switch 311 and the 1 input terminal of the analog switch 312 receive the output signal $C_{OH}$ of the color-difference signal interpolating circuit 30, while the 1 input terminal of the analog switch 311 and the 0 input terminal of the analog switch 312 receive the output signal $C_{1H}$. The analog switches 311 and 312 are set in response to an $F_H/2$ pulse in the normal image pickup mode and in the enlarging image pickup mode, in response to an $F_H/4$ pulse. In this manner, the color-difference signal converting circuit 31 converts the output signals $C_{OH}$ and $C_{1H}$ of the color-difference signal interpolating circuit 30 into color-difference signals R-Y and B-Y, which are applied to the processing circuit 75.

CNR Circuit

Figure 21:
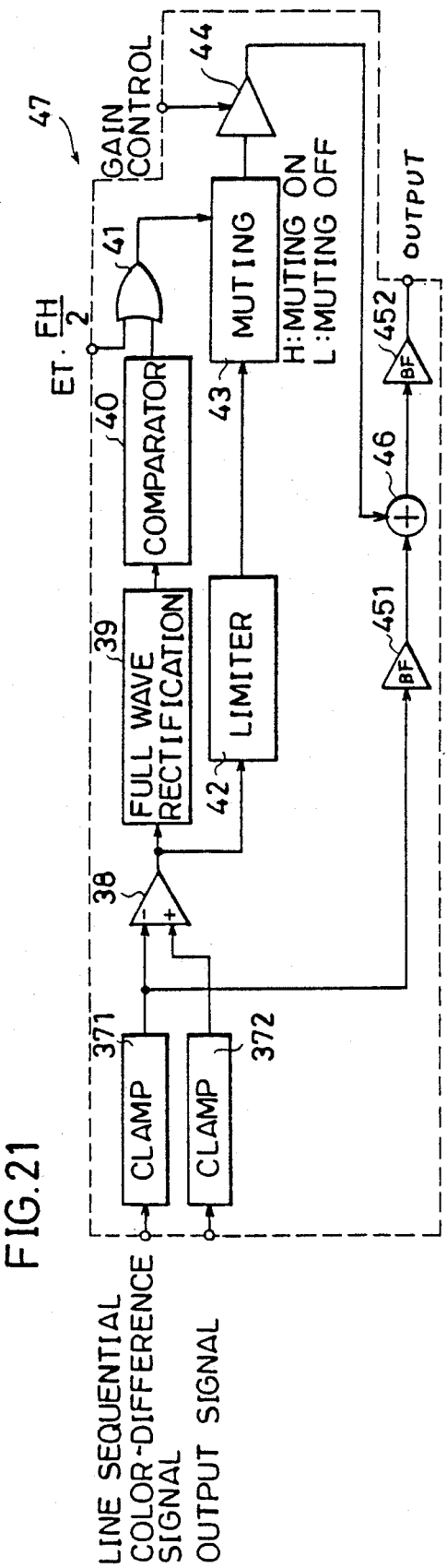
FIG. 21 is a block diagram showing a specific example of a CNR circuit.
Figure 22:
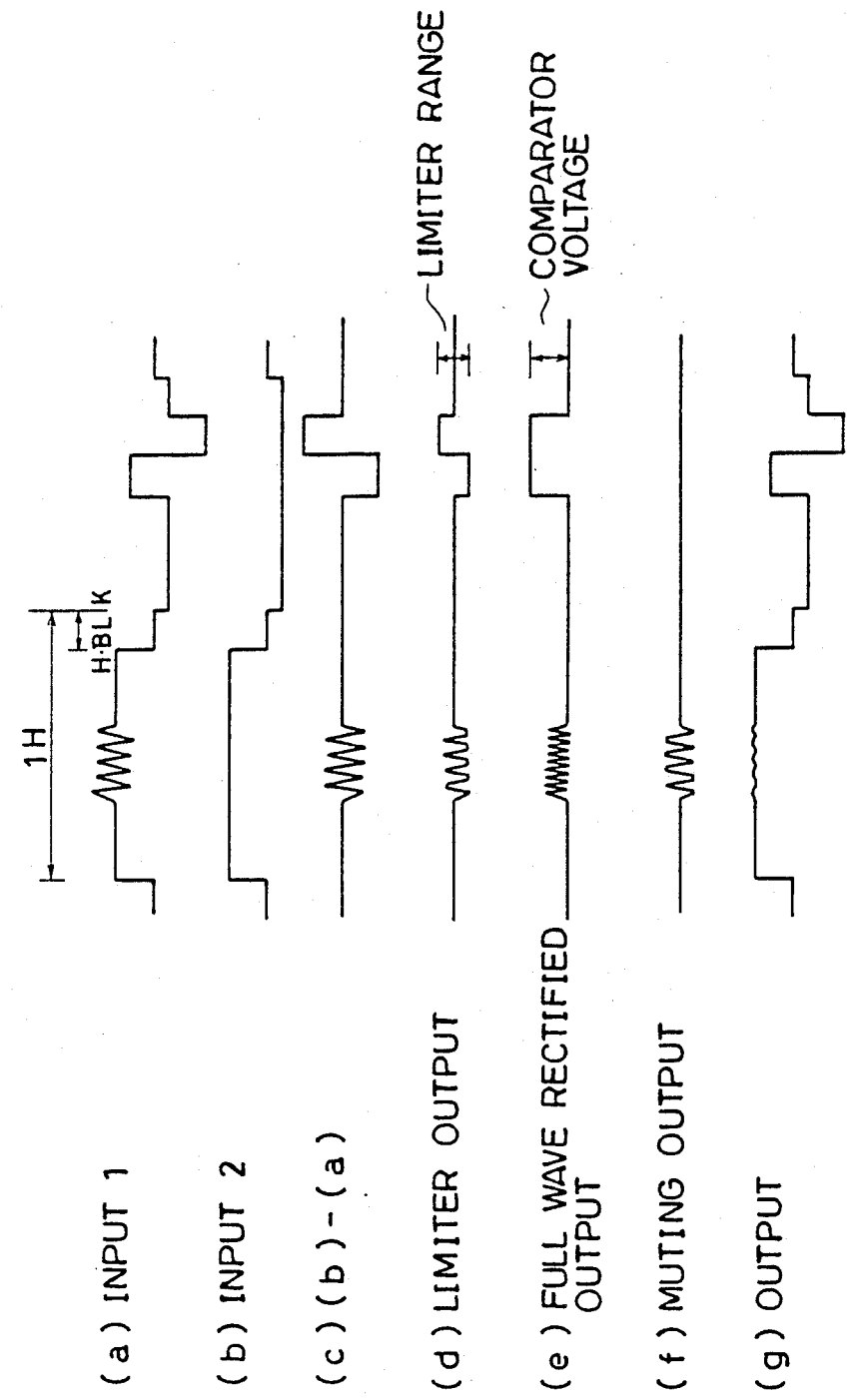
FIG. 22 is a waveform chart of the respective parts of the CNR circuit for explaining operation thereof.
Figure 23:
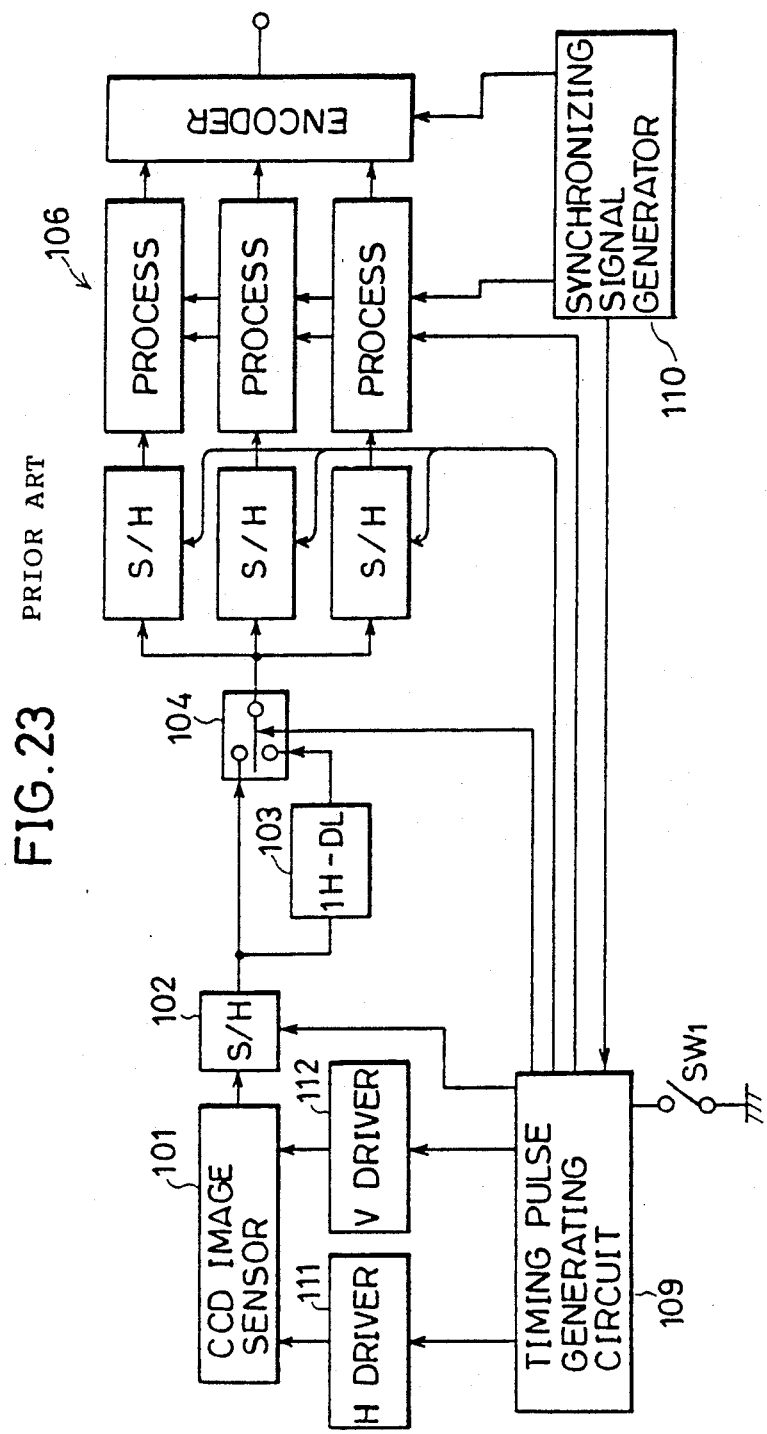
FIG. 23 is a schematic block diagram of a conventional image pickup device capable of the enlarging image pickup mode.

FIG. 21 is a block diagram showing a CNR circuit and FIG. 22 is a waveform chart of the respective parts of the CNR circuit.

As described above, when the respective outputs of the 6H delay circuit 142 are applied to the color-difference signal interpolating circuit 30, the interpolated color-difference signals shown in FIG. 17 can be obtained in the enlarging image pickup mode. Further, the interpolated color-difference signals as shown in FIGS. 18 and 19 can be obtained in the normal image pickup mode. In order to suppress random noises contained in the color-difference signals at this time, a CNR circuit 47 is generally used as a sort of cyclic filter. When the color-filter arrangement in the CCD image sensor 71 is of a diced complementary color mosaic structure, the color-difference signals obtained from the CCD image sensor 71 are line-sequential ones. Thus, in the normal image pickup mode, two 1H delay circuits are required to constitute the CNR circuit 47.

Referring to FIG. 21, the CNR circuit 47 includes clamp circuits 371 and 372, an operational amplifier 38, a full wave rectifying circuit 39, a comparator 40, an OR gate 41, a limiter 42, a muting circuit 43, a VCA 44, buffers 451 and 452, and an adder 46. The clamp circuit 371 receives the line sequential color-difference signals from the low-pass filter 52 for color-difference signals, and the clamp circuit 372 receives the output signal 5 from the 6H delay circuit 142. The clamp circuits 371 and 372 clamp the respective received signals and apply them to the operational amplifier 38.

The operational amplifier 38 performs subtraction on the received signals to apply the result to the full wave rectifying circuit 39 and the limiter 42. The limiter 42 allows passage of only those difference signals out of the output signals, or difference signals from the operational amplifier 38, that have amplitude within a predetermined range and apply them to the muting circuit 43. The full wave rectifying circuit 39 rectifies the output signal of the operational amplifier 38 over its full wave for application to the comparator 40. The comparator 40 compares the entered signal with a predetermined voltage to output the result to the OR gate 41. The OR gate 41 produces logical OR between the output of the comparator 40 and the ET·$F_H$/2 pulse, which is applied to the muting circuit 43 as a control signal. The muting circuit 43 turns muting on when the control signal from the OR gate 41 attains the "H" level and turns the muting off when it turns to the "L" level. An output signal of the muting circuit 43 is applied to the VCA 44 to have its gain adjusted, and applied to the adder 46. The adder 46 adds the output of the clamp circuit 371 applied through the buffer 451, and the output of the VCA 44 to output the result through the buffer 452.

Subsequently, referring to FIG. 22, operation of the CNR circuit shown in FIG. 21 will be described. Assume now that that a line sequential color-difference signal carrying noise for 1H period as shown in FIG. 22 (a) is entered in the clamp circuit 371, and the output signal 5 of the 6H delay circuit 142 as shown in FIG. 2 (b) is entered in the clamp circuit 372. Thus, the CNR circuit serves as a cyclic filter. The operational amplifier 38 subtracts the output of the clamp circuit 371 from that of the clamp circuit 372 and extracts noise components, as shown in FIG. 22 (c). When there exists no vertical correlation between the second 1Hs of the inputs 1 and 2, the difference signal for the second 1H period is outputted with a distinct rise and fall as shown in FIG. 22 (c), which remains even after passing through the limiter circuit 42, as shown in FIG. 22 (d).

Therefore, after the output of the operational amplifier 38 is rectified by the full wave rectifying circuit 39, if any difference signal above a predetermined level is detected by the comparator 40 as shown in FIG. 22 (e), it is identified not as noise, but as a portion lacking any vertical correlation. According to this detection output of the comparator 40, a control signal of the "H" level is applied to the muting circuit 43, through the OR gate 41, to apply muting to the portion lacking vertical correlation. As a result, only the noise components are extracted from the output of the muting circuit 43, as shown in FIG. 22 (f). The output of the muting circuit 43 is adjusted by the VCA 44 to have moderate amplitude and then applied to the adder 46, where it is added to the line sequential color-difference signal of the input 1 applied through the buffer 451 to have its noise components attenuated and the portion lacking vertical correlation outputted as is. Thus, a color-difference signal as shown in FIG. 22 (g) is outputted through the buffer 452.

Now, in case of the enlarging image pickup mode, instead of 0H and 2H signals in the normal image pickup mode, 0H and 4H signals are required. In addition, since for the input signal, an effective signal and an ineffective signal are alternately entered each for every 1H, the CNR circuit needs to be constituted as follows.

First, the output signal 5 of the 6H delay circuit 142 is used for the 4H signal. This output signal 5 is automatically switched to the 2H signal in the normal image pickup mode. For the noise detection, since the input signal is switched between an effective one and an ineffective one for every 1H, it is unnecessary to detect noises every 1H. Therefore, the output of the VCA 44 may preferably be entered in the adder 46 for every second 1H. For this purpose, in the embodiment shown in FIG. 21, when the ET·$F_H$/2 pulse entered in the OR gate 41 is at the "H" level in the enlarging image pickup, the muting circuit 43 is forced to come into operation. Meanwhile, in the normal image pickup mode, since the ET·$F_H$/2 pulse is fixed at the "L" level, noises can be continuously detected for every 1H.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image pickup device capable of picking up images of an object while electronically enlarging the same in an enlarging image pickup mode, relative to that of a normal image pickup mode, comprising:

image pickup means for picking up images of the object and for producing video signals; and a plurality of horizontal scanning period delay means for delaying said produced video signals by n horizontal scanning periods, connected in series to sequentially delay the produced video signals by 0 to n, n being an integer corresponding to the number of horizontal scanning period delay means, and individually output the delayed video signals, each of said plurality of horizontal scanning period delay means including, switching means for switching between a first and second input, to receive the produced video signals, the switching means being set to the first input and outputting said received video signals, in the normal image pickup mode, and being alternately set to the first input and to a second input, for every one horizontal scanning period, and outputting, received the video signals, in the enlarging image pickup mode, one horizontal scanning period delay means for delaying the output video signals of said switching means by only one horizontal scanning period, and gain control means for controlling gain of the delayed output video signals of said one horizontal scanning period delay means and applying the gain controlled delayed output video signals to the second input of said switching means.

2. An image pickup device capable of picking up images of an object while electronically enlarging the same in an enlarging image pickup mode, relative that of a normal image pickup mode, comprising:

image pickup means for picking up images of the object and for producing luminance signals;

a plurality of horizontal scanning period delay means for delaying said produced luminance signals by a plurality of horizontal scanning periods, connected in series, to sequentially delay the produced luminance signals by 0 to n horizontal scanning periods, n being an integer corresponding to the number of horizontal scanning period delay means, and individually output the delayed luminance signals; and luminance signal interpolating means for producing and outputting interpolated luminance signals by effecting switching between signals obtained from luminance signals that have been delayed by 0, 2, 4 and 6 horizontal scanning periods and outputted from the plurality of horizontal scanning period delay means and a luminance signal that has been delayed by 3 horizontal scanning periods, said plurality of horizontal scanning period delay means including, switching means for switching between a first and second input, to receive produced luminance signals, the switching means being set to the first input and outputting said received luminance signals, in the normal image pickup, and being alternately set to the first input and to the second input, for every one horizontal scanning period, and outputting the received luminance signals, in the enlarging image pickup mode, one horizontal scanning period delay means for delaying the output luminance signals of said switching means by one horizontal scanning period, gain control means for controlling gain of the delayed output luminance signals of said one horizontal scanning period delay means and applying the gain controlled delay output luminance signals to the second input of said switching means.

3. The image pickup device, according to claim 2, further comprising:

a first filter for eliminating a carrier component and a higher harmonic component contained in said luminance signals in the normal image pickup mode;

a second filter for eliminating said carrier component and said higher harmonic component contained in said luminance signals in the enlarging image pickup mode and for applying the luminance signals having had said carrier component and higher harmonic component eliminated, to said plurality of horizontal scanning period delay means; and selecting means for selecting output of said first filter when in the normal image pickup mode and output of said plurality of horizontal scanning period delay means when in the enlarging image pickup mode.

4. The image pickup device, according to claim 2, further comprising:

vertical contour correcting means for correcting vertical contour of the luminance signals that have been delayed by a predetermined number of horizontal scanning periods and outputted from said plurality of horizontal scanning period delay means, and outputting the vertical contour correcting signals.

5. The image pickup device, according to claim 4, further comprising:

first delay means for delaying said luminance signals to produce horizontal contour correcting signals in the normal image pickup mode;

second delay means for delaying said corrected luminance signals to produce the horizontal contour correcting signals in the enlarging image pickup mode;

selecting means for selecting output of said first delay means in the normal large pickup mode and output of said second delay means in the enlarging image pickup mode; and output means for outputting the horizontal contour correcting signals in response to said luminance signals and the luminance signals selected by said selecting means.

6. The image pickup device, according to claim 5, further comprising:

adding means for adding the horizontal contour correcting signals outputted from said horizontal contour correcting signal generating means, vertical contour correcting signals generated from said vertical contour correcting signal generating means, and said luminance signals together; and level switching means for switching signal level of the respective signals to be added by said adding means, corresponding to the normal image pickup mode and the enlarging image pickup mode, respectively.

7. An image pickup device capable of picking up images of an object while electronically enlarging the same in an enlarging image pickup mode, relative to that of a normal image pickup mode, which has a solid-state image pickup element with color filters arranged therein as diced complementary color mosaic, comprising:

n, n being an integer, horizontal scanning period delay means for delaying color-difference signals outputted from said solid-state image pickup element by n horizontal scanning periods, including a plurality of n/2 delay means connected in series to sequentially delay the color-difference signals by 0 to n horizontal scanning periods an individually output the delayed color-difference signals; and color-difference signal interpolating means for producing and outputting interpolated color-difference signals of combinations of the color-difference signals individually delayed and outputted from said n horizontal scanning period delay means and effecting switching between the respective operation outputs for every one horizontal scanning period, said n horizontal scanning period delay means including, switching means for switching between a first and second input, to receive color difference signals, the switching means being set to the first input and outputting the color difference signals, in the normal image pickup mode and being alternately set to the first input and to the second input, for every one horizontal scanning period, and outputting the color difference signals, in the enlarging image pickup mode;

one horizontal scanning period delay means for delaying the output color difference signals of said switching means by one horizontal scanning period; and gain control means for controlling gain of the delayed output color difference signals of said one horizontal scanning period delay means and applying the gain controlled delayed output color difference signals to the second input of said switching means.

8. The image pickup device, according to the claim 7, further comprising:

noise eliminating means for eliminating random noises contained in said color-difference signals, said noise eliminating means including, operating means for operating on the color-difference signals delayed by 2 horizontal scanning periods and outputted from said n horizontal scanning period delay means, in the normal image pickup mode, or the color-difference signals delayed by 4 horizontal scanning periods and outputted from said n horizontal scanning period delay means in the enlarging image pickup mode, with undelayed color-difference signals;

eliminating means for eliminating signals above a predetermined level operated on and output from said operating means;

detecting means, responsive to the detection of operating means, for detecting a portion of the color-difference signal for every horizontal scanning period, which lacks vertical correlation in voltage, suppressing means, responsive to the detection of said portion of the color-difference signal lacking vertical correlation in voltage by said detecting means, for suppressing voltage of the detected portion lacking vertical correlation of the signal outputted from said eliminating means; and adding means for adding together the signals suppressed by said suppressing means and undelayed color-difference signals.

9. The image pickup device according to claim 8, further comprising:

a first filter for eliminating the carrier component and the higher harmonic component contained in the color-difference signals in said normal image pickup mode;

a second filter for eliminating the carrier component and the higher harmonic component contained in the color-difference signals in said enlarging image pickup mode; and selecting means for selecting output of said first filter when in said normal image pickup mode and output of said second filter when in the enlarging image pickup mode, and applying the selected output to said noise eliminating means.

* * * * *